(12) United States Patent
Zenhausern et al.

(10) Patent No.: US 10,898,896 B2
(45) Date of Patent: Jan. 26, 2021

(54) THERMALLY-ACTUATED VALVE FOR METERING OF BIOLOGICAL SAMPLES

(71) Applicant: ARIZONA BOARD OF REGENTS ON BEHALF OF THE UNIVERSITY OF ARIZONA, Tucson, AZ (US)

(72) Inventors: Frederic Zenhausern, Phoenix, AZ (US); Wooseok Jung, Chandler, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 292 days.

(21) Appl. No.: 15/762,654

(22) PCT Filed: Sep. 23, 2016

(86) PCT No.: PCT/US2016/053473
§ 371 (c)(1),
(2) Date: Mar. 23, 2018

(87) PCT Pub. No.: WO2017/053817
PCT Pub. Date: Mar. 30, 2017

(65) Prior Publication Data
US 2018/0272347 A1    Sep. 27, 2018

Related U.S. Application Data

(60) Provisional application No. 62/233,225, filed on Sep. 25, 2015.

(51) Int. Cl.
*B01L 3/00* (2006.01)
*B01L 7/00* (2006.01)
*F16K 99/00* (2006.01)

(52) U.S. Cl.
CPC ......... *B01L 3/502738* (2013.01); *B01L 7/525* (2013.01); *F16K 99/0015* (2013.01);
(Continued)

(58) Field of Classification Search
CPC .............. B01L 3/502738; B01L 7/525; B01L 2200/0605; B01L 2300/0887;
(Continued)

(56) References Cited

U.S. PATENT DOCUMENTS 4,683,195 A   7/1987 Mullis et al.
4,683,292 A   7/1987 Hahn
(Continued)

FOREIGN PATENT DOCUMENTS

WO   WO 2014/090102   6/2014
WO   WO 2015/015175   2/2015

OTHER PUBLICATIONS

Araci & Quake (2012) "Microfluidic very large scale integration (mVLSI) with integrated micromechanical valves," *Lab Chip* 12(16): 2803-2806.
(Continued)

*Primary Examiner* — Michael L Hobbs
(74) *Attorney, Agent, or Firm* — Leydig, Veit & Mayer, Ltd.

(57) ABSTRACT

Provided herein are methods and devices for controlled metering of a volume of fluid into a bioreactor chamber by use of a thermally-activated actuator that provides simultaneous temperature control and fluidic valve capability. The device may be an elastomeric valve assembly comprising: a thermally-activated actuator, a microfluidic cartridge and an elastomeric membrane operably connected to the thermally-activated actuator. Upon thermal activation of the thermally-activated actuator the elastomeric contact surface is forced into a lumen of the conduit of the microfluidic cartridge to
(Continued)

fluidically seal the conduit, while the thermally-activated actuator is in thermal contact with a bioreactor chamber.

19 Claims, 10 Drawing Sheets

Specification includes a Sequence Listing.

(52) U.S. Cl.
CPC ... *F16K 99/0044* (2013.01); *B01L 2200/0605* (2013.01); *B01L 2300/0887* (2013.01); *B01L 2300/123* (2013.01); *B01L 2300/1822* (2013.01); *B01L 2400/0633* (2013.01); *B01L 2400/0655* (2013.01); *B01L 2400/0661* (2013.01); *F16K 2099/0084* (2013.01)

(58) Field of Classification Search
CPC ......... B01L 2300/123; B01L 2300/182; B01L 2400/0655; B01L 2400/0633; F16K 99/0015; F16K 99/0044; F16K 2099/0084
See application file for complete search history.

(56) References Cited

U.S. PATENT DOCUMENTS

| | | | |
|---|---|---|---|
| 5,215,339 | A | 6/1993 | Morse et al. |
| 6,045,383 | A | 4/2000 | Fujiwara |
| 7,745,211 | B2 | 6/2010 | Takayama et al. |
| 8,772,017 | B2 | 7/2014 | Battrell et al. |
| 2002/0137218 | A1* | 9/2002 | Mian ................ B01F 13/00 436/45 |
| 2004/0115068 | A1* | 6/2004 | Hansen ............... F16K 99/0001 417/379 |
| 2005/0194149 | A1 | 9/2005 | Giacomino |
| 2006/0199260 | A1 | 9/2006 | Zhang et al. |
| 2007/0267782 | A1* | 11/2007 | Gao ................ B01L 3/502707 264/320 |
| 2008/0010821 | A1 | 1/2008 | Padmanabhan et al. |
| 2008/0166793 | A1 | 7/2008 | Beer et al. |
| 2009/0057599 | A1* | 3/2009 | Namkoong ......... F16K 99/0001 251/335.2 |
| 2009/0315126 | A1 | 12/2009 | Mcavoy et al. |
| 2010/0252124 | A1* | 10/2010 | Kurt ................ B01L 3/502738 137/341 |
| 2013/0139895 | A1 | 6/2013 | Vangbo |

OTHER PUBLICATIONS

Au et al. (2011) "Microvalves and Micropumps for BioMEMS," *Micromachines* 2(2): 179-220.
Chen et al. (2011) "Electrical isolation and characteristics of permanent magnet-actuated valves for PDMS microfluidics," *Lab Chip* 11(4): 733-737.
Grover et al. (2003) "Monolithic membrane valves and diaphragm pumps for practical large-scale integration into glass microfluidic devices," *Sensors and Actuators B: Chemical* 89(3): 315-323.
Hosokawa & Maeda (2000) "A pneumatically-actuated three-way microvalve fabricated with polydimethylsiloxane using the membrane transfer technique," *J. Micromech. Microeng.* 10(3): 415-420.
Hulme et al. (2009) "Incorporation of prefabricated screw, pneumatic, and solenoid valves into microfluidic devices," *Lab Chip* 9(1): 79-86.
Hurth et al. (2010) "An automated instrument for human STR identification: Design, characterization, and experimental validation," *Electrophoresis* 31(21): 3510-3517.
Johnston et al. (2014) "Mechanical characterization of bulk Sylgard 184 for microfluidics and microengineering," *J. Micromech. Microeng* 24(3): 035017, pp. 1-7.
Jung et al. (Oct. 2015) "An air-pressure-free elastomeric valve for integrated nucleic acid analysis by capillary electrophoresis," Journal of Micromechanics and Microengineering 25(12): 125004, pp. 1-10.
Kaigala et al. (2008) "Electrically controlled microvalves to integrate microchip polymerase chain reaction and capillary electrophoresis," *Lab Chip* 8(7): 1071-1078.
Lounsbury et al. (2013) "From sample to PCR product in under 45 minutes: a polymeric integrated microdevice for clinical and forensic DNA analysis," *Lab Chip* 13(7): 1384-1393.
Manz et al. (1990) "Miniaturizedtotal chemical analysis systems: A novel concept for chemical sensing," *Sensors and Actuators B: Chemical* 1(1-6): 244-248.
Oh & Ahn (2006) "A review of microvalves," *J. Micromech. Microeng.* 16(5): R13-R39.
Pilarski et al. (2005) "An adaptable microvalving system for on-chip polymerase chain reactions," *Journal of Immunological Methods* 305(1): 48-58.
Pitchaimani et al. (2009) "Manufacturable plastic microfluidic valves using thermal actuation," *Lab Chip* 9(21): 3082-3087.
Roy et al. (Nov. 2014) "From cellular lysis to microarray detection, an integrated thermoplastic elastomer (TPE) point of care Lab on a Disc," *Lab Chip* 15(2): 406-416.
Sahota & Khaledi (1994) "Nonaqueous Capillary Electrophoresis," *Anal. Chem.* 66: 1141-1146.
Search Report and Written Opinion, dated Feb. 9, 2017, corresponding to International Application No. PCT/US2016/053473 (filed Sep. 23, 2016), parent of the present application, 19 pp.
Shin et al. (2008) "A two-step quantitative pathogen detection system based on capillary electrophoresis," *Analytical Biochemistry* 383(1): 31-37.
Shin et al. (2003) "PDMS-based micro PCR chip with Parylene coating," *J. Micromech. Microeng* 13(5): 768-774.
Unger et al. (2000) "Monolithic Microfabricated Valves and Pumps by Multilayer Soft Lithography," *Science* 288(5463): 113-116.
Yang & Lin (2007) "A latchable microvalve using phase change of paraffin wax," *Sensors and Actuators A* 134(1): 194-200.
Zhu et al. (2014) "A microfluidic device for multiplexsinglenucleotide polymorphism genotyping," *RSC Adv.* 4(9): 4269-4277.

\* cited by examiner (a)

(b)

(c)

(d)

THERMALLY-ACTUATED VALVE FOR METERING OF BIOLOGICAL SAMPLES

CROSS-REFERENCE TO RELATED APPLICATIONS

This application is a U.S. National Stage Application under 35 U.S.C. § 371 of International Application No. PCT/US2016/053473, filed Sep. 23, 2016, which claims the benefit of U.S. Provisional Patent Application No. 62/233,225 filed Sep. 25, 2015, each of which is specifically incorporated by reference to the extent not inconsistent herewith.

REFERENCE TO A SEQUENCE LISTING

A sequence listing containing SEQ ID NOs: 1-4 in computer readable form is submitted herewith and is specifically incorporated by reference. That sequence listing is supported by the specification and does not go beyond the disclosure in this International Application as filed.

BACKGROUND

Provided herein are devices and corresponding methods for reliable and efficient metering of fluids to a biochamber. The systems are particularly suited for incorporation with systems and methods for amplification of polynucleotide target sequences by polymerase chain reaction (PCR), in that the need for thermal control during the PCR sequence is used to also provide control of specially configured valves that provide and/or remove fluid from the thermally-controlled biochamber.

Amplification of minute amount of pathogens by PCR and detection of amplified pathogens by capillary electrophoresis (CE) has been extensively used for early diagnosis of diseases due to their high sensitivity and accuracy.

Microfluidic cartridges have been used as a platform for PCR and attendant detection of amplified targets. U.S. Pat. No. 8,772,017; WO 2015015175. A valve is an important component to achieve integrated analysis in a microfluidic cartridge. A valve for nucleic analysis by PCR is particularly important in a microfluidic cartridge because small sample volumes have to be preserved during harsh amplification cycles of high temperature and high pressure. Due to the need, a few valves have been demonstrated for nucleic analysis by PCR in a microfluidic cartridge with different working principles. See, Pilarski et al. (2005); Kaigala et al. (2008); Lounsbury et al. (2013); Roy et al. (2015).

A common elastomeric valve is actuated externally by air-pressure or vacuum. Such valves, however, require air-pressure or vacuum source and off-cartridge solenoid valves and control circuit boards and software. This significantly adds to the complexity and cost of the systems. Furthermore, such air or vacuum-source systems require very thin PDMS membranes whose thickness is less than about 100 to achieve the required membrane functionality. Such thin sizes impose difficulties in fabrication and handling.

Applying heat from both sides of a microfluidic cartridge can provide better thermal transfer during PCR. In those methods, however, the previous valve actuation methods by pinching PDMS or adhesive layers with mechanical pins, bolts, or magnets, are from one side of a microfluidic cartridge as those valve actuation methods can interfere with the ability to reliably and quickly transfer heat to a chamber for PCR. Accordingly, such valves cannot be applied in positions between a heating means because the mechanical actuators interfere with heat transfer, such as from a Peltier on a side of the cartridge. Also, those methods require fluidic channels to be formed of a flexible material such as PDMS, which can deformably and reversibly pinch and release, and are fundamentally incompatible with a hard or rigid substrate material, such as glass and plastic, which would fracture and break under a pinching load. Moreover, those valve actuation methods with mechanical pins of methods require either precise control of the pins for pinching or shallow depth of fluidic channels with equal or less than 100 µm. Accordingly, those methods difficult to reliably implement and tend to add complexity and expense to the system.

The devices and related methods provided herein address the aforementioned problems by utilizing a heater that is conventionally used to heat a bioreactor chamber to provide a second functionality related to an actuation mechanism for an elastomeric membrane to provide controllable on/off fluid flow to the bioreactor chamber. In this manner, the fluidic control is an integral part of the device, providing automated opening and closing in a manner coordinated with the heat engagement, while avoiding added complexity to the system.

SUMMARY OF THE INVENTION

Provided herein are systems, devices and methods for controlled on/off fluid flow to a biochamber in a manner that does not require added complex or costly components. Instead, a heating means that is normally used to provide controlled heating to a fluidic sample is also used to provide fluidic control between a fluidic open and fluidic closed configuration. For example, with respect to PCR systems, a heating element that is brought into thermal contact with a fluid chamber containing to-be-heated fluid sample is also used to provide desired valve switching characteristics for a fluidic channel that is fluidically connected to the biochamber. In contrast to conventional fluidic valve systems having additional complex mechanical components for controlling fluid flow, such as air or vacuum pressure systems, mechanical moving pins, bolts, magnets and/or the like, the instant systems and methods efficiently incorporate aspects of the heat-control elements to simultaneously control valve opening or closing. In an aspect, the heat-control element may correspond to a peltier device that provides heating by moving the heat transmitting component in contact with the biochamber, wherein the movement also can provide a mechanical deformation directly to a specially-configured elastomeric membrane and correspondingly matched fluidic conduit.

Provided herein are various elastomeric valve assemblies for controlled metering of a volume of fluid into a bioreactor chamber. The elastomeric valve assembly may comprise a thermally-activated actuator, a microfluidic cartridge and an elastomeric membrane. The microfluidic cartridge may comprise a bioreactor chamber; a fluidic conduit with an open channel portion, the fluidic conduit fluidically connected to the bioreactor chamber. The elastomeric membrane is operably connected to the thermally-activated actuator, with the elastomeric membrane comprising a contact surface in fluidic contact with the open channel portion to form a constrained conduit. Upon thermal activation of the thermally-activated actuator the elastomeric contact surface is forced into a lumen of the constrained conduit to fluidically seal the constrained conduit and the thermally-activated actuator is in thermal contact with the bioreactor chamber. For example, the actuator may be a heating element, such as a heat sink, that physically contacts the biochamber and, in so doing, physically contacts the elastomeric membrane to force a portion of the membrane into the conduit. In this manner, when physical contact with the biochamber is removed, the force on the elastomeric membrane is correspondingly removed, thereby automatically fluidically opening the fluid conduit.

The elastomeric membrane may be made from any material having properties that provide the desired functionality of movement under an applied force to block the fluidic conduit and, upon removal of the applied force, relaxation to provide a fluidically opened configuration. For example, the elastomeric membrane may comprise a polymer, rubber, or other elastic material. In an aspect, the elastomeric membrane comprises PDMS.

The elastomeric valve may comprise a protrusion opposibly positioned to the contact surface. In this manner, at least initial contact with the actuator is at a top surface of the protrusion, with deformation of the protrusion that corresponds to deformation of the contact surface in a direction toward the lumen of the fluidic conduit. For sufficient force, the lumen may fluidically obstructed by the elastomeric membrane portion that is generally vertically beneath the protrusion.

Advantages of the systems and methods provided herein include an elastomeric membrane that may be relatively thick, including substantially thicker than conventional valves that are air pressure operated. The thickness may be expressed in any number of ways, such as an average thickness that is greater than 200 µm, or between about 200 µm and 1 mm, and/or the protrusion has a height relative to an upper surface of the elastomeric membrane that is greater than or equal to 100 µm, such as between about 100 µm and 500 µm. Another expression is in terms of a ratio, such as a protrusion height to elastomeric membrane thickness ratio that is greater than or equal to 0.3 and less than or equal to 1. Alternatively, any of the membranes provided herein may have a protrusion height that is between 300 µm and 500 µm and an elastomeric membrane thickness that is between 500 µm and 700 µm.

The protrusion may be configured to provide self-alignment with the constrained conduit and the protrusion has a protrusion height selected to correspond to a depth of the open channel portion to provide upon thermal activation of the actuator an at least 70% occupancy of the open channel volume by the elastomeric membrane, thereby fluidically sealing the fluidic conduit. In other words, entire blockage of the conduit is not required, so long as the obstruction spans a cross-section to provide reliable fluidic sealing. In this manner, the open channel volume may be formed integrally in rigid walls of the fluidic conduit, or there may be an adhesive that helps provide a defined volume for blockage.

During rest, such as no force exerted on the elastomeric membrane, the elastomeric membrane contact surface may be substantially flat and the protrusion extends from an upper surface facing in a direction away from the contact surface. In this manner, during thermal actuation of the actuator, a contact force is exerted by the actuator on the protrusion forces a portion of the elastomeric membrane into a lumen of the constrained conduit, wherein: the portion has a volume that corresponds to at least 50% of the protrusion volume. As desired, the protrusion and end position of actuator that corresponds to physical contact with the biochamber, may be configured so that the volume of the membrane forced into the conduit for fluid flow blockage, corresponds to substantially the entire volume of the protrusion. In this manner, upon fluidic closure the upper surface that, at rest, has a protrusion extending therefrom, is substantially flat. Of course, the systems provided herein can accommodate tolerance to this, such that upon actuation the top surface may have a remaining protrusion, so long as a tight seal that substantially stops fluid flow is reliably achieved. In an aspect, however, the actuation force is sufficiently large and the mechanical properties of the membrane are selected so that the upper surface of the membrane is flat, thereby providing good sealing over the entire membrane contact surface in contact with the microfluidic chamber, and any layers disposed therein.

In contrast to conventional valve assemblies that rely on a flexible fluidic conduit portion to achieve fluidic on/off control via a pinching-type mechanism, the fluidic conduit provided herein may be formed in a rigid material. Rigid material refers to a material that would fracture before a desired deformation is achieved, such as glass, plastic or the like The fluidic conduit may further comprise a fluidic conduit divider to form an upstream passage and a downstream passage, wherein upon actuation of the thermally-activated actuator: a first portion of the elastomeric membrane is forced into the upstream passage; a second portion of the elastomeric membrane is forced into the downstream passage; and a portion of the elastomeric membrane contact surface contacts a top surface of the fluidic conduit divider and a top surface of each of an upstream and downstream conduit portion.

The devices and systems provided herein have a range of applications. For example, the thermally-activated actuator may be a peltier actuator integrated with a bioreactor for polymerase chain reaction (PCR), wherein the bioreactor chamber corresponds to a PCR chamber for nucleic acid amplification. The elastomeric valve assembly may then spontaneously opens and closes when heat is applied for thermal cycling during PCR to provide biological fluid to the bioreactor in the open configuration and to fluidically seal the confined conduit for nucleic acid amplification in the bioreactor during actual PCR amplification.

Any of the devices and methods may be further described in terms of one or more physical parameters, including one or more of: a constrained conduit cross-sectional area that is greater than or equal to 0.1 mm$^2$ and less than or equal to 10 mm$^2$; a constrained conduit height in a fluidically open configuration that is greater than or equal to 100 µm and less than or equal to 1 mm; a fluid flow rate through the constrained conduit during a fluidically open configuration that is greater than or equal to 1 µL/min and less than or equal to 100 µL/s; a bioreactor chamber volume that is greater than or equal to 1 µL and less than or equal to 10 mL; a volume of fluid introduced to the bioreactor chamber from the constrained conduit that is greater than or equal to 1 µL and less than or equal to 1 mL over a time course that corresponds to a decreased temperature; a fluidically-open configuration for a temperature in the bioreactor chamber that is less than 50° C.; a fluidically-sealed configuration for a temperature in the bioreactor chamber that is greater than 55° C.; an elastomeric membrane Young's modulus that is less than 100 MPa; a microfluidic cartridge Young's modulus that is greater than 10 GPa; a contact force on the protrusion during thermal activation of the actuator that is between 5 N and 10 N and that forces a portion of the elastomeric membrane into the open channel volume to fluidically seal the constrained conduit; a pressure in the fluidic conduit under a fluidically-sealed configuration that is a high pressure. (e.g. 1-20 psi). In an aspect, the flow in the fluidic conduits is laminar flow. In an aspect, the flow in the fluidic conduits is turbulent, to facilitate good mixing. In an aspect, a portion of the fluidic conduit may have turbulent flow and another portion laminar flow, where laminar/turbulent flow is determined by Reynolds number (Re), with Re less than about 2000 considered generally laminar.

A biochamber passage may be disposed through the elastomeric membrane for receiving a PCR island in which PCR amplification occurs. A top surface of the PCR island may correspond to a contact point with the actuator, wherein upon contact with the thermally actuated actuator, temperature of the biochamber is rapidly established to correspond to the temperature of the actuator. There is a corresponding deformation applied to the elastomeric membrane to fluidically seal the fluidic conduit.

A plurality of protrusions and a plurality of open channel volumes may be provided, with each protrusion paired to a unique open channel volume. In this manner, multiple simultaneously valve switches are established, so that multiple fluid conduit inlets and outlets are simultaneously fluidically controlled. Each fluidic conduit may contain a fluid serving a different function or purpose, so that with opening, there is mixing of different fluids, with the multiple fluids introduced to the biochamber.

Any of the devices provided herein may further comprise an adhesive layer positioned between a top surface of the microfluidic cartridge and a bottom surface of the elastomeric membrane. This can help maintain reliable positioning, and decrease likelihood of unwanted separation. The adhesive may also assist with defining an open conduit volume.

Also provided herein are devices for PCR, such as a system comprising: a microfluidic cartridge having fluidic conduits for introducing and removing fluid to and from a PCR chamber, at least one fluidic conduit having an open channel portion; an elastomeric membrane operably connected to the microfluidic cartridge, the elastomeric membrane having: a contact surface in fluidic contact with the open channel portion to form a constrained conduit; a protrusion extending from a top surface and opposibly positioned to the contact surface; a peltier operably connected to the protrusion, wherein upon thermal activation during PCR thermal cycling the peltier forces a portion of the elastomeric membrane into a lumen of the constrained conduit to fluidically seal the constrained conduit and the peltier is in thermal contact with the PCR chamber.

Thermal contact is used broadly herein to refer to a temperature of one component that affects the temperature of another component. The most efficient thermal contact is physical contact, wherein there is direct thermal convection between two components. Thermal contact may also include indirect physical contact, wherein intervening layers or components prevent direct physical contact, but not thermal convection via the intervening components. So long as there is adequate thermal convection to provide desired rate of heating of the biochamber, such as greater than about 0.5° C./sec, the thermal contact may have any number of intervening components.

The protrusion may have a volume, and the volume of the elastomeric membrane forced into the lumen of the constrained conduit substantially corresponds to the protrusion volume, such as within 20%, 10% or 5% of the protrusion volume.

Any number of additional fluidic and PCR components may be included, such as a microfluidic pump for driving fluid flow in the fluidic conduits; a biological sample chamber configured to receive polynucleotides from a sample and primers for amplification of a target sequence; a fluid chamber configured to receive fluid for use with PCR amplification, wherein each of the fluid chamber and biological sample chamber are fluidically connected to the PCR chamber, and one or more open channel portions are positioned upstream of the PCR chamber to provide controlled fluid introduction to the PCR chamber from the biological sample chamber and the fluid chamber.

The system may further comprise a downstream fluid conduit positioned downstream of the PCR chamber, the downstream fluid conduit having a downstream constrained conduit; and wherein the elastomeric membrane has a second protrusion positioned so that during PCR thermal cycling the peltier forces a portion of the elastomeric membrane into a lumen of the downstream constrained conduit to fluidically seal the downstream fluid conduit, thereby fluidically sealing the PCR chamber both downstream and upstream of the PCR chamber.

Also provided herein are methods related to the systems and devices, including methods of making or using any of the systems and devices described herein. For example, provided is a method of making an elastomeric valve assembly for controlled metering of a volume of fluid into a bioreactor chamber, the method comprising the steps of: providing an elastomeric membrane having a contact surface, a top surface, and a protrusion extending from the top surface, wherein the protrusion is separated from the contact surface by an elastomeric membrane thickness; providing a microfluidic cartridge having an open channel portion; connecting the elastomeric membrane to the microfluidic cartridge, wherein the protrusion is aligned with the open channel portion, thereby forming a constrained fluid conduit; operably connecting a thermally-activated actuator to a top surface of the protrusion, wherein: in an at-rest state the constrained fluid conduit is in a fluidically open configuration for movement of fluid through the constrained fluid conduit to or from the bioreactor chamber; in a thermally-activated state the constrained fluid conduit is in a fluidically closed configuration that prevents movement of fluid through the constrained fluid conduit to or form the bioreactor chamber, the fluidically closed configuration from a portion of the elastomeric membrane that vertically coincides to the protrusion that is forced into an open channel volume of the constrained fluid conduit.

The connecting step may comprise applying an adhesive layer between the elastomeric membrane and a top surface of the microfluidic chamber, and adhesively connecting the membrane to the top surface of the microfluidic chamber.

The microfluidic cartridge open channel portion may comprise a pair of through-holes that are physically separated from each other by a separation distance; and the elastomeric membrane protrusion is positioned to vertically coincide and encompass the separation distance between the pair of through holes. The separation distance may also be vertically offset from a top surface of the microfluidic chamber, or a top surface of an adhesive layer positioned on the top surface of the microfluidic chamber, such as an offset depth that is between about 100 μm and 5 mm, and any sub-ranges thereof. For ease of manufacture and assembly, the top surface of the microfluidic may be flat and made of a rigid, inflexible material, with and adhesive layer having a thickness of between about 100 μm and 5 mm supported thereon, with an adhesive opening corresponding to the open channel portion, and an elastomeric membrane supported on top the adhesive layer. The Young's modulus of the adhesive layer, especially upon adhesion, may be a factor of 10, factor of 100, or more, greater than the Young's modulus of the elastomeric membrane. In this manner, an applied force on the membrane ensures there is a preferential deformation of the elastomeric membrane, with relatively little or no observable deformation of the microfluidic cartridge and/or the adhesive layer.

There may be a plurality of pairs of through holes, each pair of through holes aligned with a unique protrusion.

The elastomeric membrane thickness may be greater than 300 μm and the protrusion height greater than 100 μm, and the elastomeric membrane is made by injection molding. This is in contrast to conventional valves having much smaller membrane thicknesses, that are not compatible with injection molding, but rather requires thin film casting methods.

Also provided herein are methods of using any of the devices provided herein, such as a method for controlled fluid metering to a bioreactor chamber by: providing any of the assembly or systems described herein; filling the constrained conduit and bioreactor chamber with a fluid; thermally contacting the bioreactor chamber with an actuator, wherein during the thermal contact the actuator forces a portion of the elastomeric membrane beneath the protrusion into the fluidic conduit to fluidically seal the constrained conduit; removing the thermal contact between the bioreactor chamber and the actuator, thereby relaxing the elastomeric membrane and removing the portion of the elastomeric membrane from the constrained conduit, thereby opening the constrained conduit so that fluid may flow into and/or out of the bioreactor chamber; wherein the fluidic opening occurs spontaneously for a temperature below a user-selected open temperature set-point and fluidic sealing occurs spontaneously for a temperature above a user-selected close temperature set-point. The user-selected close temperature set-point may correspond to the application of interest. For example, in PCR typical thermal cycling temperature, related to annealing and separation of nucleic acid strands, will be greater than about 50° C. to 55° C., up to much higher temperatures. During these thermal cycling, the biochamber should be fluidically sealed. Accordingly, for a biochamber temperature that is accordingly about or greater than 50° C., the fluidic conduit of interest is automatically in a sealed configuration.

An advantage of the instant methods and systems is that the biochamber heating can occur from both a top side and a bottom side of the microfluidic cartridge. For example, wherein both the heating and actuation is from a peltier assembly.

Any of the methods and devices may be used with PCR amplification of a target polynucleotide.

Any of the methods and devices may be used with fluidic conduits that are formed within a plastic or glass material, without flexible portions, such as an elastomer.

Any of the methods and devices may have a protrusion volume, and a volume of the membrane that is forced into the constrained conduit lumen and downstream and upstream passage, substantially corresponds to the protrusion volume.

DETAILED DESCRIPTION OF THE INVENTION

Figure 1A:
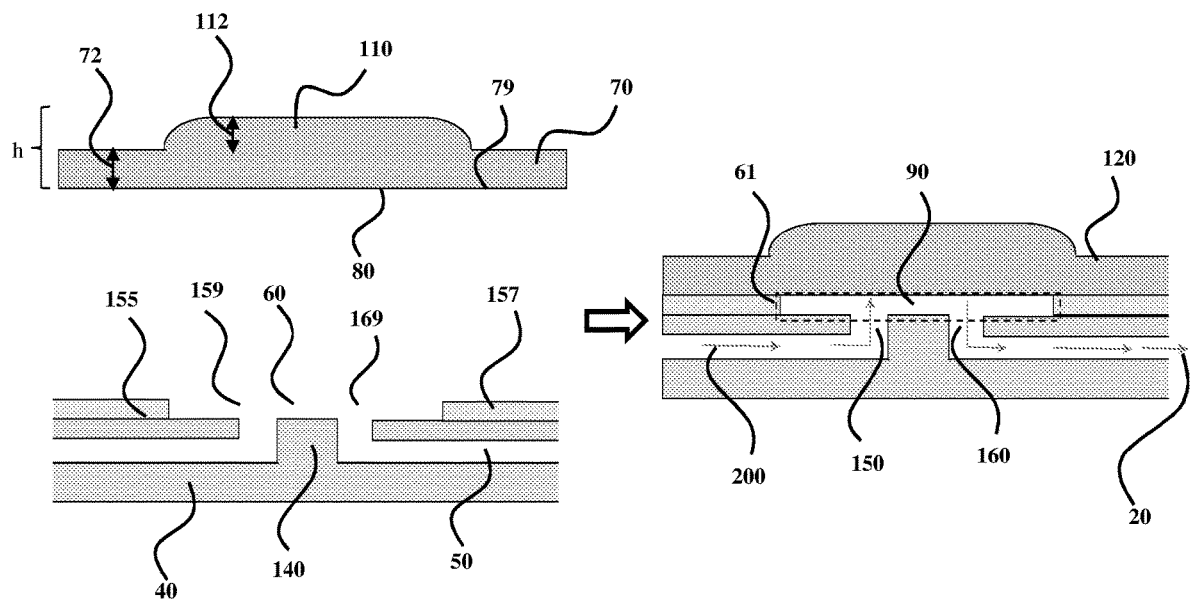
FIG. 1A is a schematic of an elastomeric membrane (top left) and microfluidic cartridge (bottom left) separate (left panel) and together (right panel) to form a constrained conduit.

In general, the terms and phrases used herein have their art-recognized meaning, which can be found by reference to standard texts, journal references and contexts known to those skilled in the art. The following definitions are provided to clarify their specific use in the context of the invention.

"Thermally-activated actuator" refers to a component that provides controlled heating to a biochamber and that in so doing, exerts a physical force on an elastomeric membrane as part of a valve-type mechanism providing on/off fluid flow. For example, the actuator may correspond to a heat block or sink that maintains a certain temperature. Similarly, the actuator may correspond to a peltier system, having an electric-based means for generating heat, that provides heating to a biochamber. A common function of the actuators provided as part of the instant systems and methods, is that they move in and out of thermal contact with the biochamber and as part of that motion, engage and disengage the elastomeric membrane. This engagement corresponds to a force on a protrusion that acts to force the membrane into the conduit lumen, thereby providing a physical obstacle to fluid flow. This physical obstacle to fluid flow is also referred herein as fluidically sealed. "Thermal activation", accordingly, refers to the actuator that is in a position to provide heat to the biochamber and, due to the design configuration, simultaneously provide fluidic sealing via the valve mechanism of the elastomeric membrane in the fluidic conduit.

"Microfluidic cartridge" refers to a fluidic conduit network arranged to controllably provide and remove fluids to a biochamber. The cartridges of particular use herein are generally rigid.

"Open channel" refers to a fluid conduit having an unconstrained portion, such as opposed inlets and outlets on the top surface of the cartridge. Flowing fluid through such an outlet results in leakage of fluid around the outlet. In contrast, a contact surface of an elastomeric membrane confines the open channel, referred herein as a constrained conduit. In this case, flow of fluid out of the inlet results in that fluid flowing into the inlet, and there is substantially no leakage.

"Self-alignment" refers to design and placement of an elastomeric protrusion such that upon actuation, the only feasible location in the cartridge to correspondingly receive the elastomeric membrane is the conduit lumen. In this manner, irrespective of deviations or offset, alignment is ensured.

"Flexible" or "elastomeric" refers to shape deformation under an applied force, and that can accordingly return to an original at-rest state upon removal of the applied force. Accordingly, an elastomeric membrane refers to a material whose shape under an applied force can at least partially conform to a channel lumen shape to occupy the lumen and present an obstacle to fluid flow. When the force is removed, the membrane retreats from the lumen, thereby allowing fluid flow. A "rigid material", in contrast, cannot reliably deform under an applied force and return to an original shape. One quantitative indication of an elastomeric material is Young's modulus (defined as stress/strain), such as a polymer material having a Young's modulus that is less than or equal to 10 GPa, less than or equal to 10 MPa, or less than about 1 MPa. A rigid material, in contrast, cracks or fractures before any substantial deformation occurs, such as a greater than 1% or 5% strain.

Polymerase Chain Reaction ("PCR") is a technique in which cycles of denaturation, annealing with primer, and extension with DNA polymerase are repeatedly used to amplify the number of copies of a DNA segment, up to and greater than $10^6$ times. PCR and associated PCR conditions are known in the art and are described more fully in U.S. Pat. Nos. 4,683,195 and 4,683,292, which are herein incorporated by reference. A "primer" is a single stranded oligonucleotide or DNA fragment which hybridizes to a DNA strand. In PCR, primers are generally paired, with a 5' forward primer that hybridizes with the 5' end of the DNA sequence to be amplified, and a 3' reverse primer which hybridizes with the complement of the 3' end of the sequence to be amplified. The amplified DNA sequence encompasses the target sequence hybridized by both primers, as well as the intervening sequence between both primer target sequences.

"PCR island" refers to the portion of a PCR device at least containing the biochamber where the actual PCR occurs, and so that must be available for thermal control.

"Removably connected" refers to a configuration of elements, wherein the elements can be temporarily connected to each other and, as desired, removed from each other without adversely impacting the functionality of other elements of the device. "Translationally connected" refers to a configuration of elements, wherein motion of one element is substantially unidirectional and parallel with respect to another element, wherein movement of one element does not affect each element's functionality. "Operably connected" refers to a configuration of elements, wherein an action or reaction of one element affects another element, but in a manner that preserves each element's functionality. For example, an elastomeric membrane operably connected to a thermally-activated actuator refers to the ability of the actuator to effect a force on the elastomeric membrane to deform and seal a conduit, without impacting the functionality of the ability to provide temperature control to a biochamber of have the membrane prevent leaks of the fluid out of the cartridge.

"Fluidically connected" refers to a configuration of elements, wherein a fluid (e.g., liquid, gas or viscoelastic material) in one element is able to enter another element in a manner that does not affect each element's functionality. For example, a fluid conduit that is fluidically connected to a chamber does not affect the chamber's ability to contain a material for a desired application or reaction of interest.

"Fluid" refers to a liquid that may be removed or introduced to a biochamber, including a liquid that flows through a conduit under an applied force or pressure difference. Depending on the application of interest, the fluid may be for a PCR reaction and may contain material suspended and carried by the fluid for use in a reaction that occurs in a biochamber.

Unless defined otherwise, "substantially" refers to a value that is within at least 20%, within at least 10%, or within at least 5% of a desired or true value. Substantially, accordingly, includes a value that matches a desired value. "Substantially flat" refers to a surface that does not have any observable channels, features or recesses on the surface.

Example 1

Air-Pressure Free Elastomeric Valve for Integrated Nucleic Acid Analysis by Capillary Electrophoresis Provided herein is a new elastomeric valve for integrated nucleic acid analysis by capillary electrophoresis. The valve provides metering to capture a designated volume of biological sample into a polymerase chain reaction (PCR) chamber, fluidically sealing to preserve the sample during PCR cycling, and transfer of the PCR-products and on-chip formamide post-processing and labeling for the analysis of DNA fragments by capillary gel electrophoresis. This new valve differs from conventional PDMS valves in that the valve is not actuated externally by air-pressure or vacuum so that it simplifies a DNA analysis system by eliminating the need for air-pressure or vacuum source and off-cartridge solenoid valves and control circuit boards and software. Instead, the valves provided herein are actuated by a thermal cycling peltier assembly integrated within the hardware instrument that tightly comes in contact with a microfluidic cartridge for thermal activation during PCR so that it spontaneously closes the valve without an additional actuator system. The valve has protrusions in the designated locations to provide self-alignment that does not require precise alignment of a valve actuator. Moreover, the thickness of the new valve is around 600 µm with additional protrusion height of 400 µm so that it is easy to handle and very feasible to fabricate by injection molding compared to other PDMS valves whose thicknesses are around 30~100 µm. The valve provides over 95% of metering performance in filling the fixed volume of the PCR chamber, preserves over 97% of the sample volume during PCR, and shows very comparable capillary electrophoresis peak heights to the benchtop assay tube controls with very consistent transfer volume of the PCR-product and on-chip formamide denaturation. The valves provided herein can perform a core function for integrated nucleic acid analysis by capillary electrophoresis.

Amplification of minute amount of pathogens by polymerase chain reaction (PCR) and detection of amplified pathogens by capillary electrophoresis (CE) have been extensively used for early diagnosis of diseases due to their high sensitivity and accuracy [1].

After the advent of the concept of micro total analysis system [2], a valve has been one of the core components to achieve integrated analysis in a microfluidic cartridge [3-8]. Especially, the need of the valve for the nucleic analysis by PCR is critical in a microfluidic cartridge because small volume of sample has to be preserved during harsh amplification cycles of high temperature and high pressure. Due to the need, a few valves have been demonstrated for nucleic analysis by PCR in a microfluidic cartridge with different working principles [9-12].

One of the most common elastomeric valves is actuated externally by air-pressure or vacuum [13,14]. However, it needs air-pressure or vacuum source and off-cartridge solenoid valves and control circuit boards and software. Also, it requires very thin PDMS membrane whose thickness is less than 100 µm imposing difficulties in fabrication and handling [8,15].

It has been shown that applying heat from both sides of a microfluidic cartridge can provide better thermal activation during PCR [16]. In this method, the previous valve actuation methods by pinching PDMS or adhesive layers with mechanical pins [9,12] or bolts [11,17] or magnets [6] from one side of a microfluidic cartridge cannot be applied as the mechanical actuators block the contact of a heat activation unit such as peltier device in the side. Also, the methods require fluidic channels to be made with PDMS rather than other hard substrate materials such as glass and plastic in order to enable the actuation methods based on the flexibility of the PDMS. Moreover, the previous valve actuation methods with mechanical pins require either precise control of the pins for pinching or shallow depth of fluidic channels with equal or less than 100 µm [9,12,17].

A valve that can seal to preserve sample during PCR cycling and transfer PCR-products and on-chip formamide for integrated nucleic analysis by capillary electrophoresis is developed. Meanwhile, the valve is designed for actuation by a direct instrumental interface exploiting the peltier devices mounted into a rapid DNA analysis system [18] without other additional actuators, such as an air-pressure source, and to be compatible with the hard plastic disposable microfluidic cartridge.

Figure 1B:
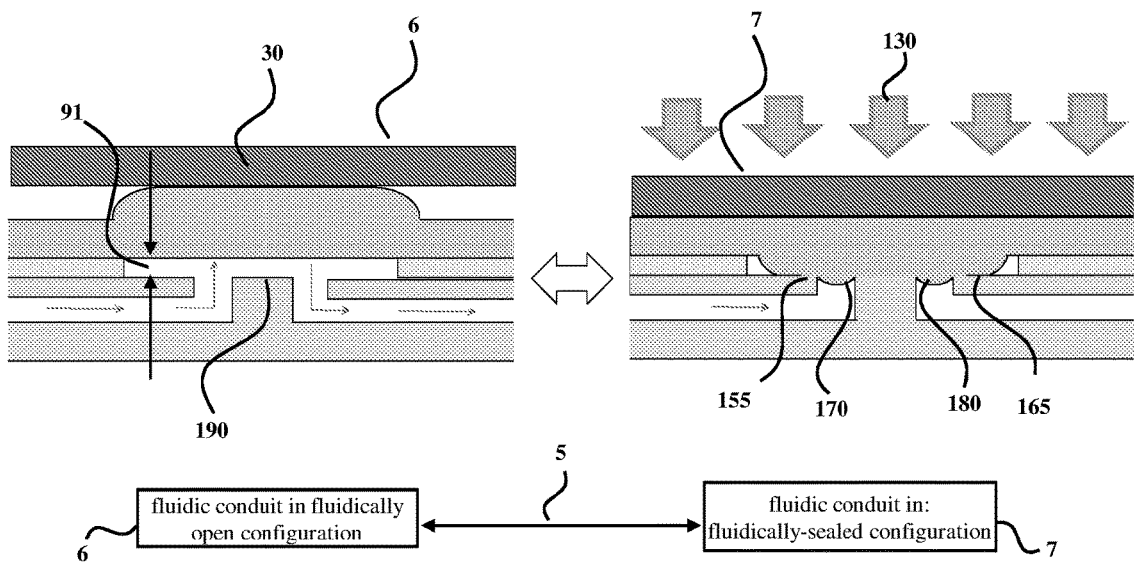
FIG. 1B illustrates the elastomeric valve assembly in a fluidic open configuration (left panel) and a fluidically closed configuration (right panel), such as occurs with temperature cycling. As indicated in the bottom panel with the two-sided arrow, valve opening and closing corresponding to fluidic open and fluidic closed configuration is automatically coupled to temperature change via force application of a thermally-actuated actuator, such as a Peltier integrated as part of a PCR device. This summarizes the working principle of an air-pressure free elastomeric valve actuated by a peltier device installed in the instrument for integrated nucleic analysis by capillary electrophoresis. In the fluidically open state (FIG. 1B left panel), liquid sample freely flows through the channels and in a fluidically-sealed configuration (FIG. 1B right panel) a peltier, which transfers thermal profiles during PCR by tight contact to a PCR chamber, automatically presses the protrusions on the elastomeric membrane to close and seal the channel during PCR thermal cycling and amplification. After PCR, the peltier is released so that the valve comes to the open state for the transfer of PCR-product and Formamide.

FIG. 1A-1B shows the valve design and actuation to achieve the functionality and purposes described above in an exemplified elastomeric valve assembly. There are two disconnected channels on the polycarbonate microfluidic cartridge, with the region therebetween generally described as an "open channel portion" 60. (FIG. 1A, left panel, bottom). The trimmed area that acts as a channel on the pressure sensitive adhesive interconnects provides the interconnection between the two disconnected channels. On top of the adhesive 157, the elastomeric membrane 70 sits, having an upper surface 120 and bottom surface 79. In an open state 6, liquid sample freely flows through the channels as shown in FIG. 1B (left panel). When the peltier devices that activate thermal profiles during PCR come into tight contact to a PCR chamber, they automatically press the protrusions 110 on the elastomeric membrane 70 to close the channels for sealing 7 during PCR, as shown in FIG. 1B (right panel). This actuation, including by a peltier, is also generally referred to as a thermally activated or actuated actuator 30. After PCR, one of the peltier devices is released from the cartridge surface so that the valve comes back to the open state 6 for the transfer of PCR-product and formamide to perform DNA modification and labeling for CE separation. Moreover, this valving principle does not require a shallow fluidic channel height that is typically necessary in conventional valving mechanism using direct pinching of the fluidic channel for actuating sealing. That is because the proposed new valving actuation does not happen on the fluidic channel of the cartridge but on the trimmed area of the adhesive on the valve, e.g., the open channel portion. This approach is generally more compatible and cost effective for mass production.

As further illustrated in FIGS. 1A-1B, the elastomeric membrane 70 has a substantially flat bottom surface 79 that acts as a contact surface 80 with respect to the open channel portion 60 of the microfluidic cartridge 40. A protrusion 110 extending from the membrane top surface 120, that is positioned so as to vertically oppose the open channel portion 60. The membrane has a total thickness or height, h, which is the sum of the thickness 72 of the membrane away from the protrusion plus the protrusion height 112. The microfluidic cartridge 40 portion has an open channel portion 60 formed between and around the downstream passage 160 and upstream passage 150 of fluidic conduit 50. As desired, a fluidic conduit divider 140 may separate the upstream 150 and downstream 160 portions, such as between two disconnected orifices 159 169 that extend out of the cartridge 40. When the elastomeric membrane is brought into contact with the microfluidic cartridge, the contact surface and open channel portion together form a constrained conduit 90, with a corresponding constrained conduit lumen having a constrained conduit height and an open channel volume 61, as illustrated by the dashed rectangle in FIG. 1A (right panel). The bioreactor chamber 20 is fluidically connected to the constrained conduit, such as via the downstream passage 160, as indicated by the direction of fluid flow in the conduit.

The elastomeric membrane portion that forms a surface of the constrained conduit may be referred herein as a contact surface 80, and may have a substantially flat or flat surface, such as without any channels disposed therein. Instead, the constrained channel may be formed between the downstream and upstream passages and the flat contact surface, as illustrated in the right panel of FIG. 1A and the left panel of FIG. 1B. A thermally-activated actuator 30, such as a peltier of the PCR, may generate a force 130 on the protrusion 110, thereby causing at least a portion of the contact surface and attendant elastomeric membrane, to be forced into the constrained conduit lumen. As desired, the membrane and actuation or contact force 130 may be configured to ensure a portion of the contact force is physically positioned within the downstream, upstream, or both downstream and upstream passages. This aspect is identified in the right panel of FIG. 1B as "first portion" 170 and "second portion" 180. Further reliable sealing is achieved by configuring the elastomeric membrane, actuation force, geometry so that the elastomeric membrane contacts a top surface 155 of the upstream conduit portion, top surface 190 of the fluidic conduit divider, and top surface 165 of the downstream conduit portion. In this manner, a reliable fluidically sealed configuration is achieved with attendant functional benefit for thermal cycling 5 matched to fluidic conduit fluidically open band fluidically sealed 7 configurations (see bottom panel of FIG. 1B).

Figure 2:
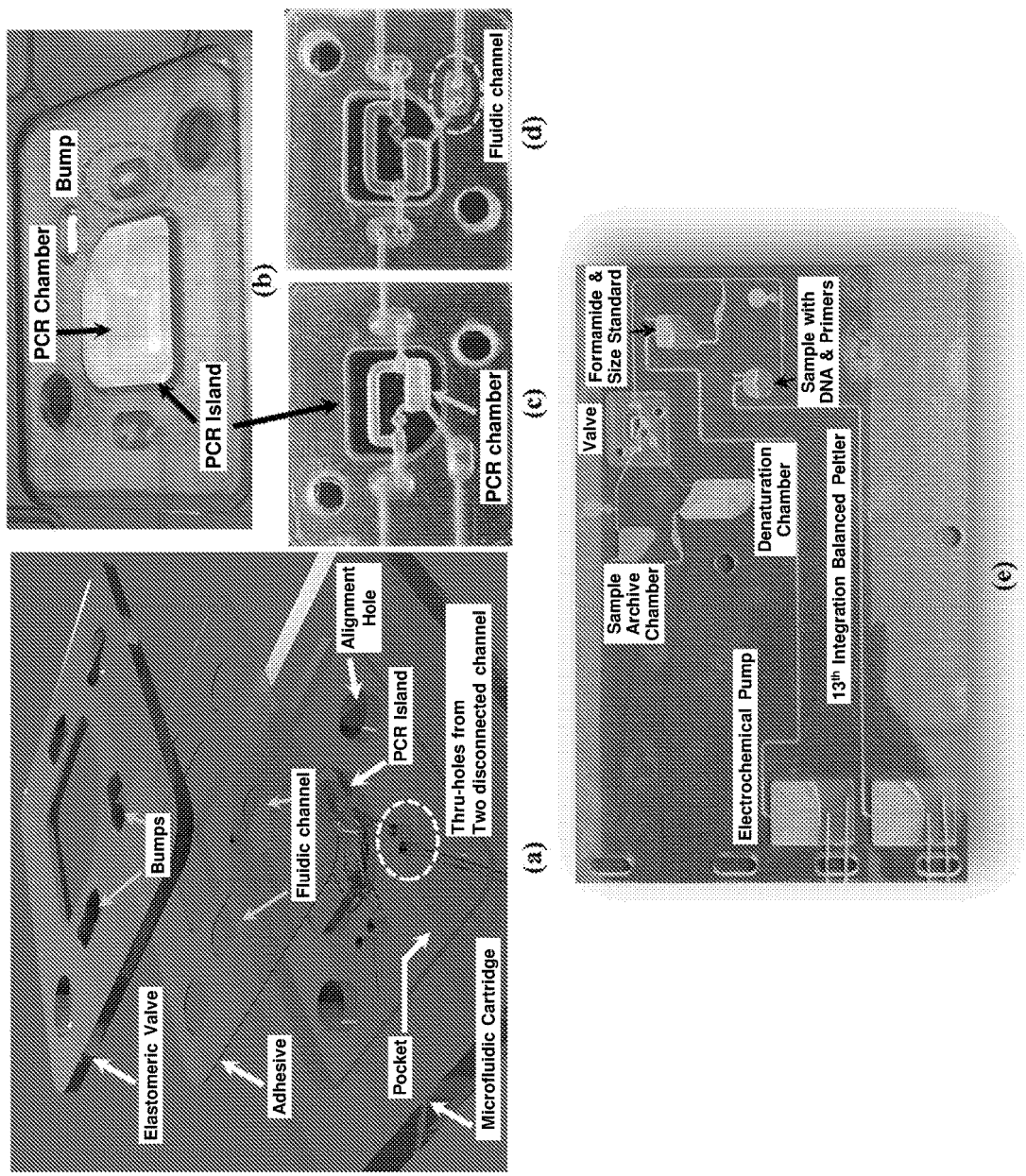
FIG. 2. (a) Exploded view for the assembly of the valve, illustrating the elastomeric membrane, adhesive layer, and microfluidic cartridge containing a PCR island with necessary fluidic channels and biochamber for PCR; (b) Illustration of the assembled elastomeric valve assembly; (c) Front view of the valve assembly; (d) Rear view of the valve assembly; and (e) A system for PCR amplification, formed of a microfluidic cartridge containing the valve with integrated pumps and reagent chambers. For clarity, the peltier that provides controlled heating to the PCR chamber is not illustrated.

The microfluidic cartridge is fabricated by a computer numerical control (CNC) machine (MDX-540S, Roland) from polycarbonate (PC) sheet (8574K21, McMaster-Carr). One side of the microfluidic cartridge has pumps, fluidic channels, reagent chambers, a PCR chamber, a denaturation chamber as shown in FIG. 2(e). The cartridge is sealed by a pressure-sensitive double-sided adhesive (90106, Adhesives Research) and a plain PC sheet. The opposite cartridge side of the PCR chamber has a local pocket where the elastomeric membrane can sit while having an intact PCR island to be touched by the peltier assembly for a direct thermal activation as shown in FIG. 2(a)-(c).

Figure 7:
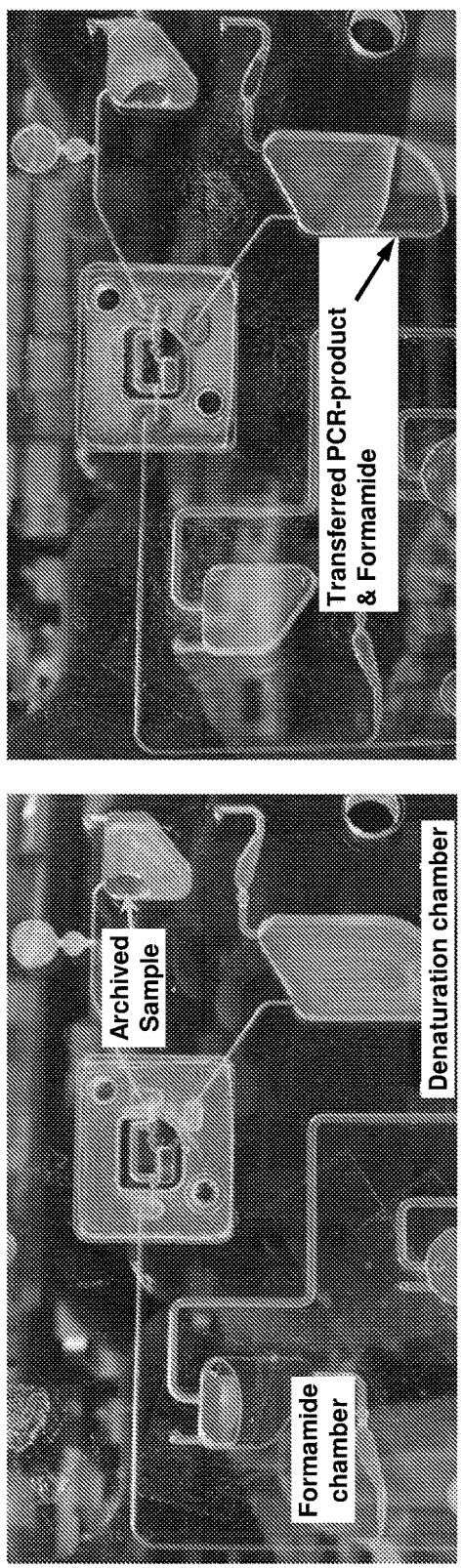
FIG. 7. Transfer performance of the valve integrated on the cartridge. (a) Picture of the cartridge before PCR that shows excessive sample collected in the sample archive chamber and the formamide mixed with internal size standard; (b) Picture of the cartridge after PCR and transfer that shows transferred mixture of PCR-product, formamide, and internal size standard collected in the denaturation chamber; and (c) Transferred volume of PCR-product, formamide, and internal size standard retrieved in the denaturation chamber.
Figure 7:
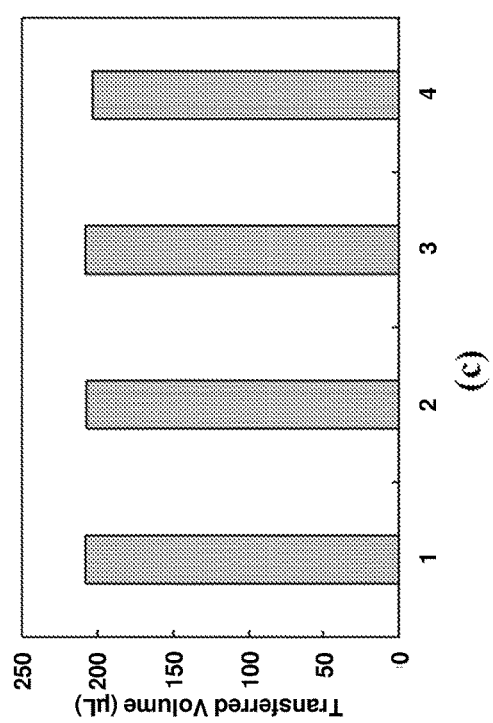

A pressure-sensitive adhesive (S1001-1DC11, Adhesives Applications) has trimmed areas that are used as microfluidic channels connecting two through-holes from two disconnected channels on the opposite side of the microfluidic cartridge as shown in FIGS. 2(a) and (d). Meanwhile, the adhesive is used for bonding between the pocket on the cartridge and the elastomeric valve. The peel adhesion test on the pressure sensitive adhesive by PSTC-101 is 24 oz/in. Technically speaking, the bonding strength of the adhesive is not relevant to the sealing performance of the valve because the sealing of the PCR chamber is accomplished by blocking the through-holes directly with the elastomeric membrane and the fluidic sealing takes place in the fluidic channel where there is no adhesive (see FIG. 1B). The bonding strength is sufficiently strong enough for the metering as demonstrated by the FIG. 4 and for the transfer of the PCR product and the formamide as demonstrated by FIG. 7. The adhesive has 25.4 μm thick silicone adhesive on both sides with 25.4 μm thick PET film carrier at the center based on the manufacturer's specification while the measured total thickness is around 100 μm.

The elastomeric valve has protrusions on a level surface. The protrusions are positioned to be self-aligned with the fluidic channels in the adhesive and the thru-holes in the cartridge. The elastomeric membrane has a cut-out region in the center to accommodate an intact PCR island on the cartridge allowing a direct thermal activation from the peltier assembly to the PCR island as shown in FIGS. 2(a) and (b). The thickness of the leveled surface on the elastomeric valve is around 600 μm and the height of the protrusions around 400 μm, while the width of the protrusions is about 2 mm.

The volume of the protrusion that is exposed above the surface of the PCR island is the criterion on the selection of the protrusion size of the valve. The exposed volume should be large enough to achieve a good sealing by providing sufficient force on the protrusions when the protrusions are pressed to close the through-holes (e.g., the constrained conduit) in the microfluidic cartridge. At the same time, the exposed volume should be small enough to be contained inside the fluidic channel on the adhesive when the valve is pressed. If the volume is too large, the entire volume of the exposed protrusion cannot be fully contained inside the fluidic channel and the residual part of the protrusion remains as a physical barrier in between the PCR island and the peltier so that a direct thermal transfer from the peltier to the PCR island cannot occur. Thus, although the valve can seal the through-holes without any leakage, the valve cannot be used for the PCR application if the valve becomes a hindrance in obtaining the desired PCR performance.

Figure 9:
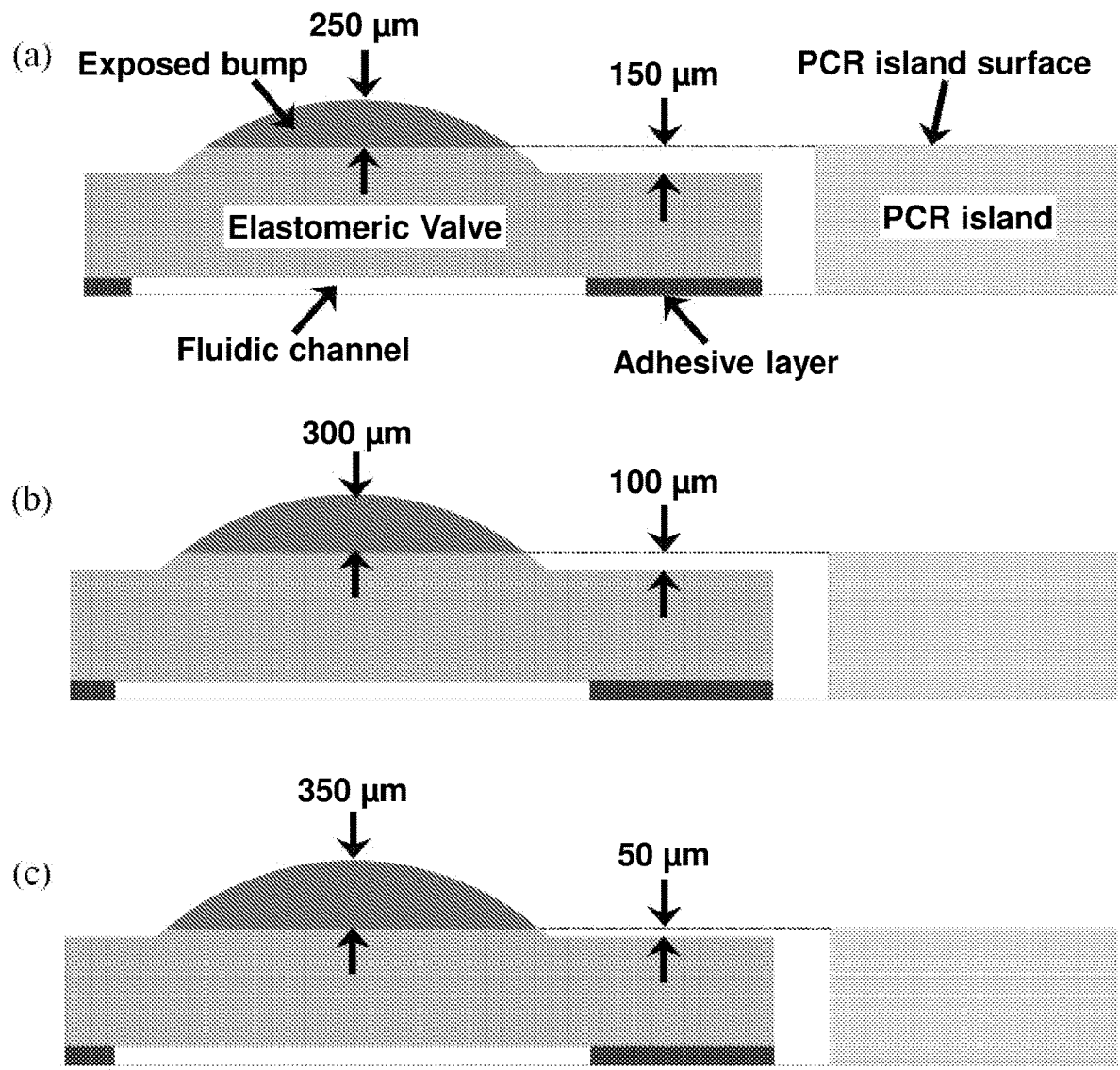
FIG. 9. Three different exposed heights (250 µm, 300 µm, and 350 µm) of the protrusion from the 2 mm width and the 400 µm height of the protrusion size. (a) The exposed height (250 µm) of the protrusion obtained by making the pocket depth on the cartridge to 150 µm; (b) The exposed height (300 µm) of the protrusion obtained with the pocket depth of 100 µm; and (c) The exposed height (300 µm) of the protrusion obtained with the pocket depth of 50 µm.

The obround shape of the fluidic channel on the adhesive shown on the FIG. 2(a) has 2.5 mm width and 4 mm length in order to provide enough sealing area to close the through-holes by the pressed protrusion and to minimize a dead volume. Because the volume of the fluidic channel is 0.868 mm$^3$, the volume of the exposed protrusion should be close to 0.868 mm$^3$ to be contained in the volume of the fluidic channel when the protrusion is pressed. With the 2 mm width and the 400 μm height of the protrusion size, three different exposed heights (250 μm, 300 μm, and 350 μm) of the protrusion are tested as their exposed volumes (0.702 mm$^3$, 0.948 mm$^3$, and 1.224 mm$^3$) are close to 0.868 mm$^3$. The different exposed heights of the protrusion are obtained by changing the pocket depth on the cartridge to 150 μm, 100 μm, and 50 μm, respectively as shown in the FIG. 9 and tested for a leakage from the PCR chamber during the PCR thermal cycle.

When the valve is exposed 250 µm above the PCR island, the area when the protrusion is pressed 250 µm down into the z direction as indicated by the FIG. 1B and FIG. 9(a) is 4.65 mm². The force applied to the protrusion at the state is calculated as 6.14 N by using the Young's modulus (1.32 MPa) of the PDMS cured at 23° C. [19]. When the valve is exposed 300 µm above the PCR island, the area when the protrusion is pressed 300 µm down into the z direction as indicated by the FIG. 9(b) is 5.69 mm². The force applied to the protrusion at the state is calculated as 7.47 N. As the area when the protrusion is pressed 350 µm down into the z direction shown in the FIG. 9(c) is 5.80 mm², the force applied to the protrusion at the state is calculated as 7.65 N.

Figure 5:
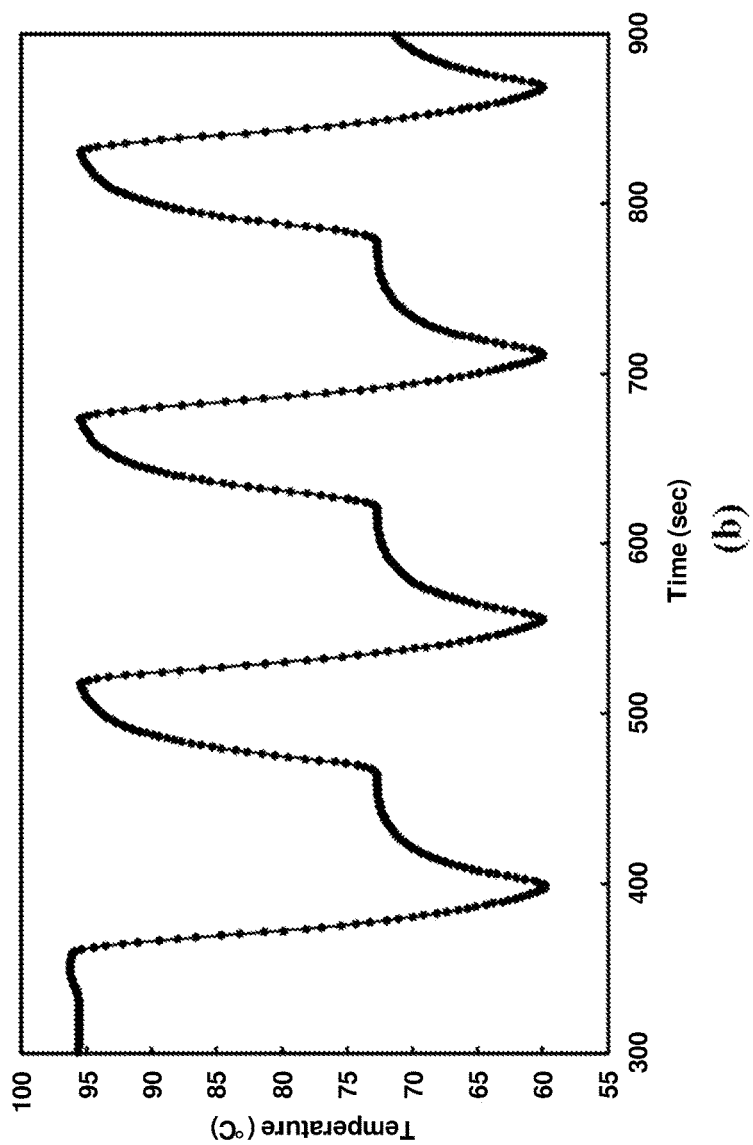
FIG. 5. Thermal cycle during PCR measured by a thermocouple located inside a PCR chamber. (a) A picture showing a thermocouple inserted inside the PCR chamber and (b) Thermal profile during PCR measured by the thermocouple. The initial denaturation step and the first 3 cycles are presented.
Figure 5:
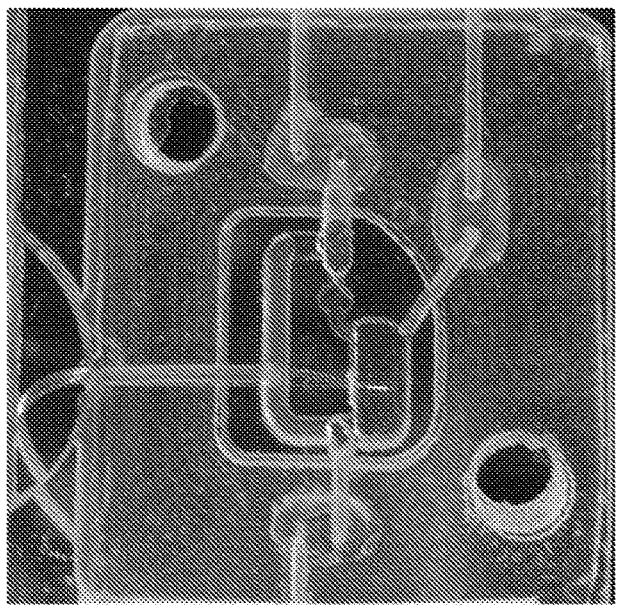
Figure 10:
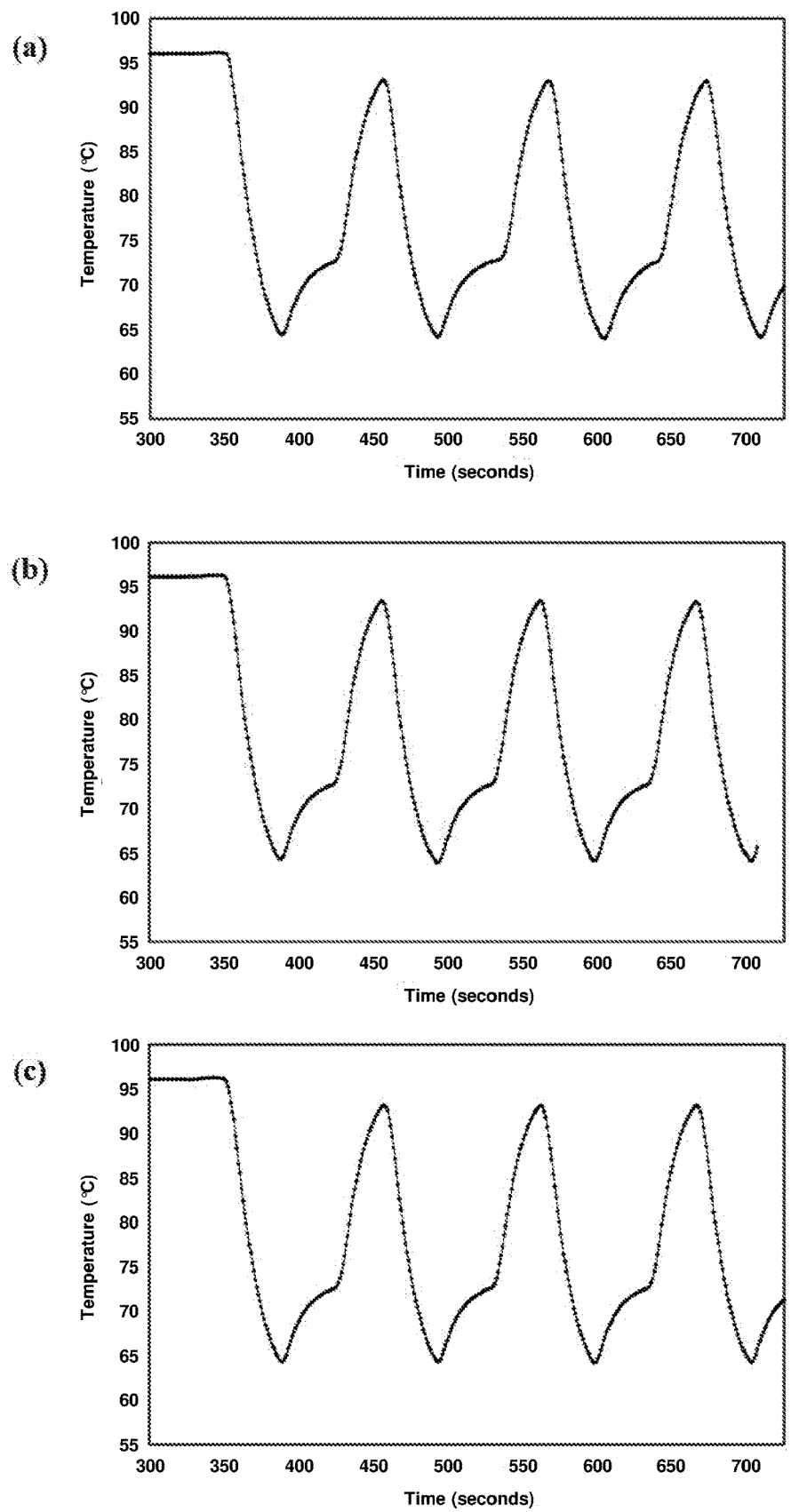
FIG. 10. Thermal profiles during PCR with three different exposed protrusion heights (The initial denaturation step and the first 3 cycles are presented). (a) 250 µm of protrusion exposed height; (b) 300 µm of protrusion exposed height; and (c) 350 µm of protrusion exposed height.

After testing that there is no leakage on the three different exposed heights of the protrusion under the applied force ranging from 6.14 N to 7.65 N, thermocouples are inserted inside the PCR chambers as shown in the FIG. 5(a) and thermal profiles during PCR are measured and compared to determine optimal protrusion size. As shown in the FIG. 10, because the thermal profiles during PCR with the three different exposed protrusion heights are almost identical, the exposed protrusion height of 350 µm is selected. Therefore, the valve can accomplish both the sealing of the PCR chamber and a direct thermal transfer to the PCR island when the peltier assembly physically contacts the PCR island, thereby ensuring maximum thermal contact.

Figure 3:
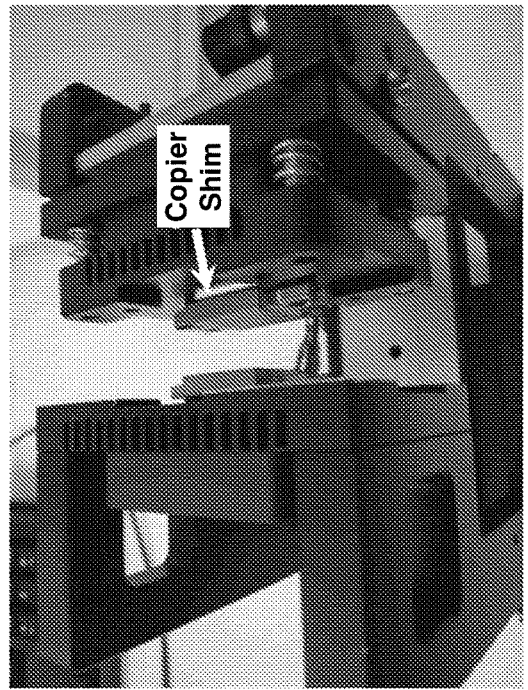
FIG. 3. Picture of the peltiers describing how the peltier is mechanically pushed towards the valve. (a) Picture of back and front peltiers that are used for the thermal activation by contacting the back and the front of the microfluidic cartridge. The front and the back copper shims transfer a thermal profile from the peltier assemblies to the PCR chamber and are leveraged as the actuator of the valve; (b) 3D drawing of a shaft and an armature attached to the front peltier assembly. When the shaft rotates, the front peltier assembly moves on a linear (non-concentric orbital) axis and presses the protrusions closing the valve; (c) Picture of the microfluidic cartridge while the peltier assemblies are in an open state, i.e. the valve is open; and (d) Picture of the microfluidic cartridge while the peltier assemblies are in a closed state, i.e. the valve is closed to provide a fluidically sealed configuration.
Figure 3:
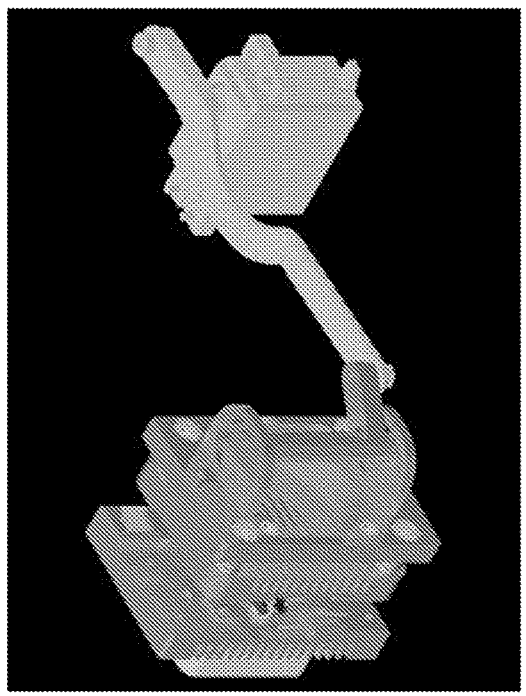
Figure 3:
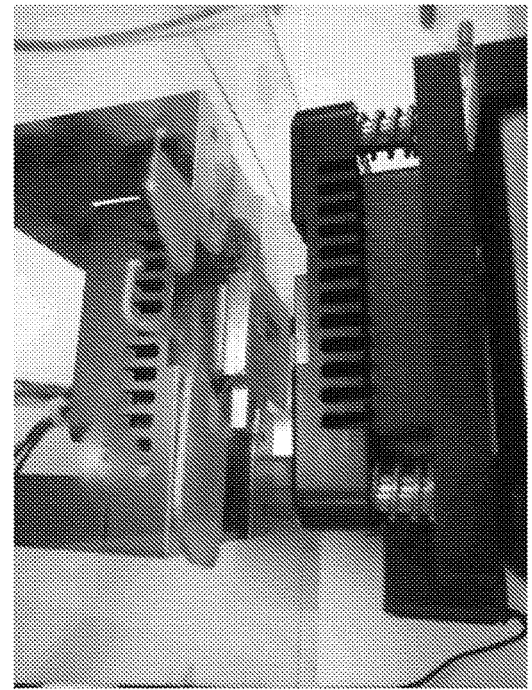
Figure 3:
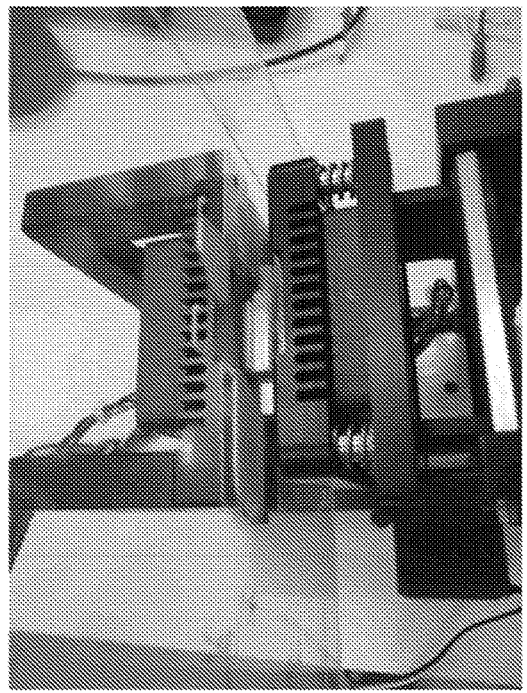

FIG. 3 shows pictures of the peltier assemblies describing how the peltier is mechanically pushed towards the valves. The front and the back copper shims (FIG. 3(a); 3(c)) transferring thermal profile from the peltier assemblies to the PCR chamber are leveraged for the actuator of the valve. As shown in FIG. 3(b), the front peltier assembly is attached to a shaft and an armature. When PCR thermal cycling needs to be performed for the integrated nucleic acid analysis, the shaft rotates resulting in a movement of the front peltier assembly on a linear (non-concentric orbital) axis as illustrated in FIG. 3(b). This movement spontaneously presses the protrusions, closing the valve as shown in FIG. 3(d).

The master mold for replicating the elastomeric valve was also fabricated by the CNC machine from high-density polyethylene (HDPE) sheet (8619K441, McMaster-Carr). The elastomeric valve was made from polydimethylsiloxane (PDMS) by casting PDMS (1:10 w/w, Slygard 184, Dow Corning) into the master mold and curing at room temperature. To avoid evaporative loss of the sample during PCR due to the porosity of the PDMS, the valve was conformably coated with 2.5 µm thick Parylene layer [16,20].

To demonstrate the disease detection capability of the valve and systems provided herein, *Escherichia coli* (*E. coli*) is used as a representative nucleic acid. *E. coli* genomic DNA is extracted by DNeasy Blood & Tissue qiagen kit following manufacturer's instructions (catalog #69506, Qiagen). Primers target a 332 bp portion of the uidA gene specific to *E. coli*. For the purpose of eventual visualization of PCR product on a capillary electrophoresis, a PET-dye is attached to the reverse primer. The *E. coli* primer and amplicon sequences are summarized in Table 1). Mixture of *E. coli* DNA (0.625 pg/µL, Northern Arizona University), forward primer (0.6 µM, IDT Technologies), reverse primer (0.6 µM, PET-dye, Life Technologies), and amplification grade H₂O is loaded into the sample chamber shown in FIG. 2(e). Lyophilized PCR pellet (catalog #639278, Clontech) is pre-loaded inside the PCR chamber. For capillary electrophoresis analysis, 200 µL of Hi-Di formamide (catalog #4311320, Life Technologies) and 3 µL of GeneScan LIZ 25 500 size standard (catalog #4322682, Life Technologies) are also pre-loaded in the formamide chamber. 600 µL of 0.05M NaCl and 600 µL of 0.25M NaCl solution are pre-loaded in the integrated electrochemical pump1 and pump2, respectively.

TABLE 1

*E. coli* assay information with the forward primer sequence, reverse primer sequence, 332 bp amplicon top strand and bottom strand sequences

| SEQ. ID NO. | Description | Sequence |
|---|---|---|
| 1 | Forward primer sequence | uidA_ECOL_F: CGTATCACHGTTTGTGTGAACAA |
| 2 | Reverse primer sequence | uidA_ECOL_R/PET: GGATTCACYACTTGCAAAGTCC |
| 3 | 332 bp amplicon sequence - Top strand sequence underscore corresponds to the forward primer | <u>CGTATCACCGTTTGTGTGAACAA</u>CGAACTGAACTGGC AGACTATCCCGCCGGGAATGGTGATTACCGACGAAAA CGGCAAGAAAAAGCAGTCTTACTTCCATGATTTCTTTA ACTATGCCGGGATCCATCGCAGCGTAATGCTCTACAC CACGCCGAACACCTGGGTGGACGATATCACCGTGGTG ACGCATGTCGCGCAAGACTGTAACCACGCGTCTGTTG ACTGGCAGGTGGTGGCCAATGGTGATGTCAGCGTTGA ACTGCGTGATGCGGATCAACAGGTGGTTGCAACTGGA CAAGGCACTAGCGGGACTTTGCAAGTGGTGAATCC. |
| 4 | 332 bp amplicon sequence - Bottom strand sequence bold corresponds to the reverse primer | GGATTCACCACTTGCAAAGTCCGCTAGTGCCTTGT CCAGTTGCAACCACCTGTTGATCCGCATCACGCAGTTC AACGCTGACATCACCATTGGCCACCACCTGCCAGTCA ACAGACGCGTGGTTACAGTCTTGCGCGACATGCGTCA CCACGGTGATATCGTCCACCCAGGTGTTCGGCGTGGT GTAGAGCATTACGCTGCGATGGATCCCGGCATAGTTA AAGAAATCATGGAAGTAAGACTGCTTTTTCTTGCCGTT TTCGTCGGTAATCACCATTCCCGGCGGGATAGTCTGCC AGTTCAGTTCGTTGTTCACACAAACGGTGATACG. |

After pre-loading the above materials, the pump1 transfers the sample mix in the sample chamber into the PCR chamber while flowing excess sample mix into the sample archive chamber. The metered sample mix dissolves the lyophilized PCR pellet and the peltier assembly shown in FIG. 2(f) is brought to contact with the PCR chamber to provide thermal cycling while spontaneously closing the elastomeric valve.

The PCR protocol used for the amplification of the genomic E. coli DNA is as follows. After 5 minutes of initial denaturation at 94° C., thirty-four thermal cycles of annealing at 60° C. for 5 seconds, extension at 72° C. for 30 seconds, and denaturation at 94° C. for 20 seconds are performed.

After the PCR thermal-cycles, the peltier assembly is removed from the PCR chamber, thereby also simultaneously opening the elastomeric valve. The pump2 moves PCR-product from the PCR chamber and the mixture of formamide and size standard from the formamide chamber to the denaturation chamber. The mixture on the denaturation chamber is removed from the cartridge and analyzed by a capillary electrophoresis (CE) instrument (3130xl, Applied Biosystems) with POP-4 polymer separation matrix (catalog #4352755, Life Technologies), DS-33 dye set kit (catalog #4345833, Life Technologies), and 36-cm array (catalog #4315931, Life Technologies).

For the preparation of benchtop tube-controls, the PCR components are mixed in a PCR tube with a total 20 µL volume same as the on-chip PCR chamber volume and undergoes the PCR protocol in a thermo-cycler (Tetrad PTC-225, MJ Research). 1 µL of PCR-product is mixed with 10 µL of the formamide and 0.15 µL of the size standard and analyzed by the CE instrument.

Metering Capability: Metering capability is critical in an integrated microfluidic cartridge for nucleic acid analysis as the cartridge performs sample preparation step and only a designated volume of the prepared sample needs to be captured in the PCR chamber to satisfy a desirable PCR chemistry ratio with the on-chip PCR pellet while flowing excessive volume of the sample to a sample archive chamber.

Figure 4:
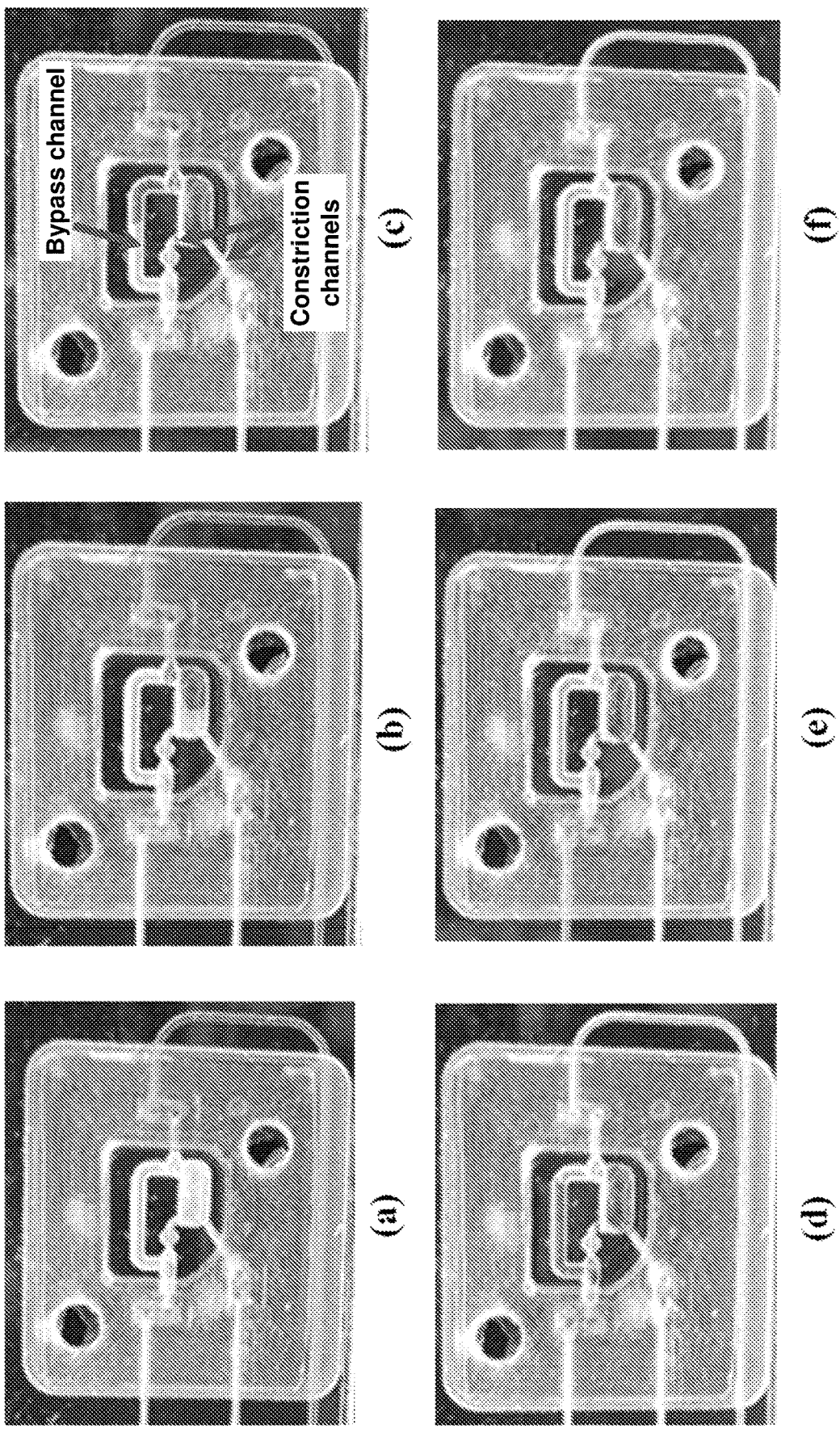
FIG. 4. Pictures to show metering performance of the valve. (a) Excessive volume of sample for PCR comes to the entrance of the valve; (b) The sample starts to fill the PCR chamber; (c) After completely filling the PCR chamber, excessive volume of the sample flows through the bypass channel; (d) Air at the rear end of the sample clearly cuts the edge of the sample in the PCR chamber; (e) Excessive volume of the sample exits the top of the valve; and (f) All the excessive volume of the sample exits the valve and moves to the sample archive chamber, leaving designated volume of the sample in the PCR chamber.

FIG. 4 shows a metering performance of the valve. A sample enters into an entrance of the valve while flowing the two disconnected channels through the fluidic channel in the adhesive. After the sample fills the PCR chamber whose volume is 20 µL with 2.5 mm height, excessive sample continues to flow through the bypass channel (1 mm width*1 mm height square channel) due to a higher fluidic resistance from the constriction channels (0.5 mm width*0.2 mm height round channel). After flowing the entire volume of the sample, only designated volume of the sample remains in the PCR chamber as shown in FIG. 4(f). The valve filled over 95% of the fixed volume of the PCR chamber in more than ten valves.

Adhesive Biocompatibility: Although the sample meets the adhesive during the metering process, the sample and the PCR reagents do not get in touch with the adhesive during PCR because the thru-holes are fully blocked by the valve. Nevertheless, a biocompatibility of the adhesive is tested by putting a piece of the adhesive into the mixture of the sample and the PCR reagents and running qPCR with Stratagene MxPro 3005. The qPCR result showed no inhibition by having mean 1.07 ng/µL with standard deviation of 0.27 ng/µL from 1 ng/µL reference D2057 DNA (n=3).

Thermal Profile inside the PCR Chamber: Precise thermal profile is very critical in achieving a desirable amplification result. Due to the thermal conductivity of the polycarbonate material in the microfluidic cartridge, a discrepancy can exist between the thermal protocol commanded into a thermal system and the thermal profile in the PCR chamber where the amplification actually takes place. Moreover, it has to be verified that the protrusions in the valve are fully squeezed so that peltier gets in a full contact to the PCR island to supply the desired thermal protocol. Thus, a type-K thermocouple (Omega, USA) is directly inserted into the PCR chamber as shown in FIG. 5(a) and the thermal protocol in the system was adjusted to obtain the desired PCR thermal profile. FIG. 5(b) shows a thermal profile of the initial denaturation step and the first 3 PCR cycles measured by the thermocouple inside the PCR chamber. It reflects the desired PCR protocol.

Sealing Performance of the Valve: One of the most important functions for the valve is to seal the PCR chamber during the PCR cycle with a reasonable valve response time. The valve response is instantaneous. When the peltier came into contact with the PCR island, the valve is closed. The response time of the valve does not need to be very quick, in µs range as the peltier temperature increases with 2° C./second and it took over 70 seconds for the internal temperature of the PCR chamber to reach over 94° C. for the initial denaturation step.

Figure 6:
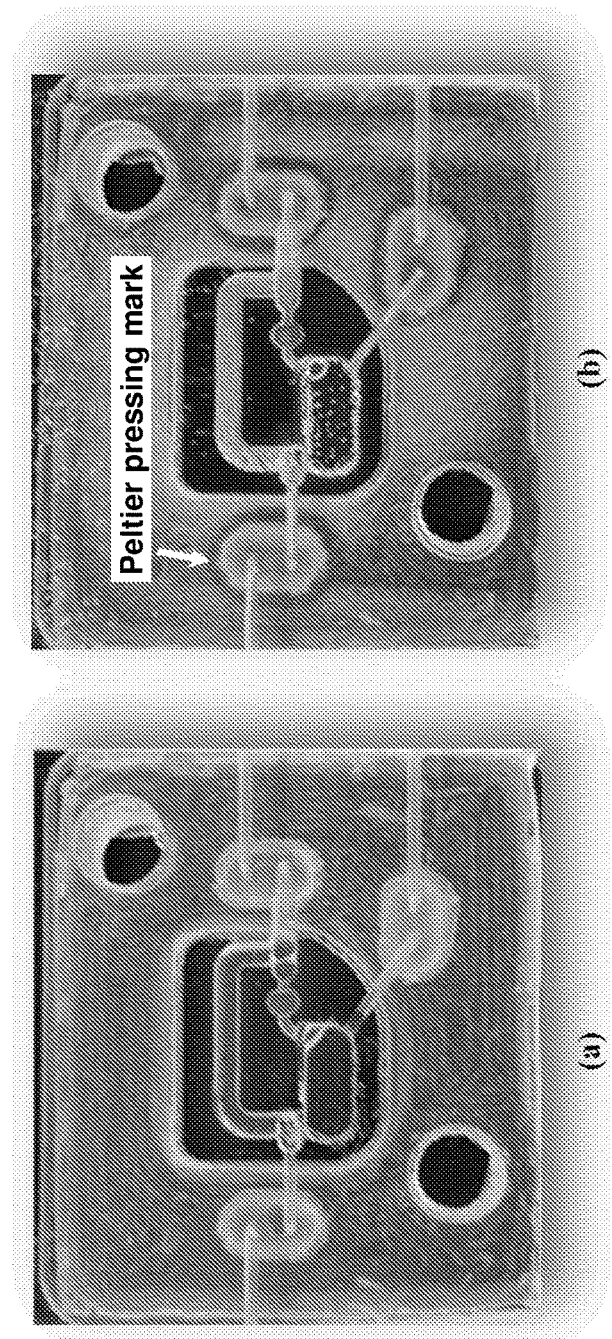
FIG. 6. Sealing performance of the valve. (a) Picture before PCR; (b) Picture after PCR showing pressing mark by the peltier around the valves; and (c) Preserved volume after PCR compared to the volume before PCR.
Figure 6:
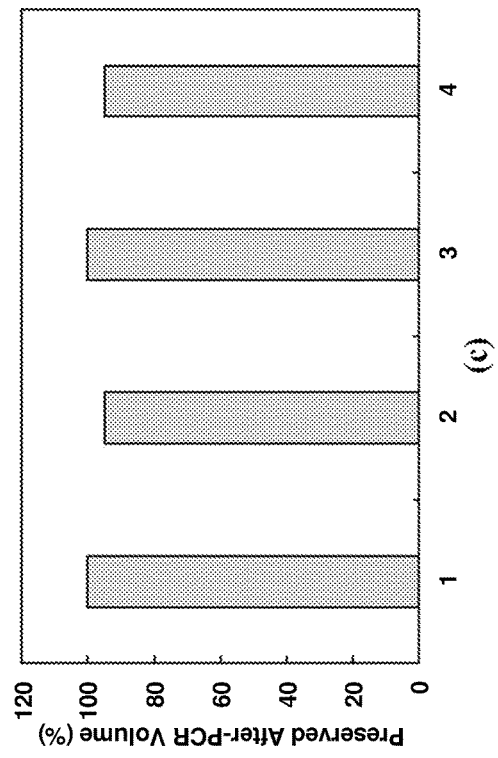

FIG. 6(a) shows a picture of the valve region with the sample captured inside the PCR chamber after metering. FIG. 6(b) shows a picture of the same valve after going through the PCR cycle. The picture manifests that the sample is clearly preserved with the peltier pressing mark around the valving area. FIG. 6(c) shows 97.5% of reaction volume (standard deviation=2.9%, n=4) is preserved after the PCR compared to the volume before PCR indicating that the valve performs a good sealing performance during the PCR cycle.

Transfer Performance of the Valve: For integrated nucleic acid analysis by capillary electrophoresis, the valve should successfully and consistently transfer the PCR-product into the denaturation chamber for the following denaturation process of the amplified DNA fragments. During the transfer, the valve should also carry the on-chip formamide that affects larger ionic strength and higher electric field strength for higher efficiency and faster analysis time of capillary electrophoresis (CE) [21] into the denaturation chamber.

FIG. 7(a) shows the microfluidic cartridge after metering and before PCR. Excessive sample is collected in the sample archive chamber and the formamide and the internal size standard are in the formamide chamber. After PCR, both PCR-product and the formamide mixture are transferred into the denaturation chamber after opening the valve by removing the peltier from the PCR island. FIG. 7(b) shows transferred mixture of PCR-product, formamide, and size standard collected in the denaturation chamber while showing the empty formamide chamber and the PCR chamber. Transferred volumes of PCR-product, formamide, and internal size standard retrieved in the denaturation chamber are consistent as shown in FIG. 7(c) (mean: 206.5 µL, standard deviation: 2.4 µL, n=4).

Figure 8:
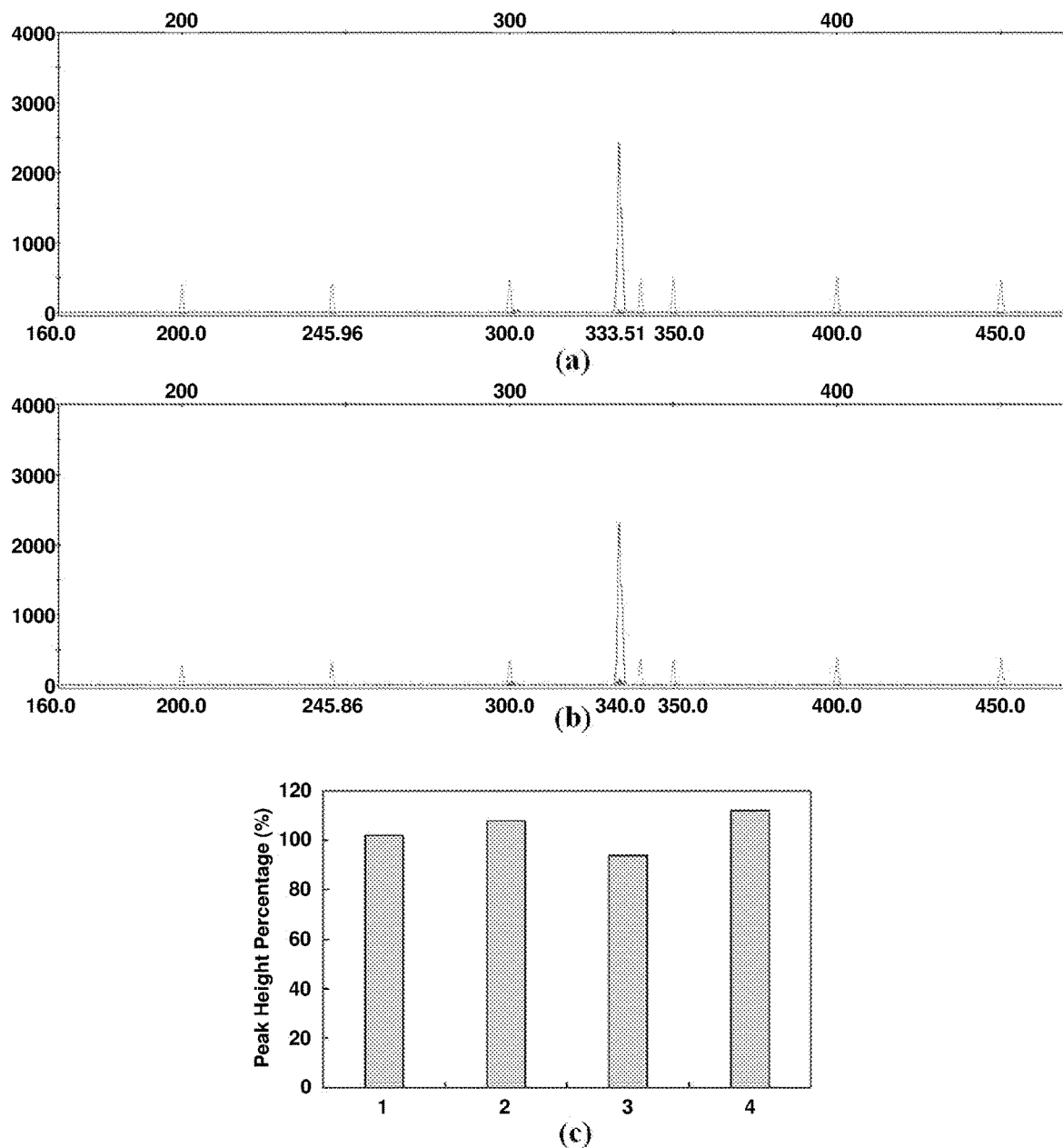
FIG. 8. Peaks from capillary electrophoresis. (a) Peak from a mixture of on-cartridge PCR-product and on-cartridge transferred formamide and internal size standard; (b) Peak from tube PCR and manual mixing of formamide and internal size standard into the PCR-product from the tube PCR; and (c) Capillary electrophoresis peak heights from four on-cartridge transferred mixtures compared to the tube controls.

Capillary Electrophoresis: The transferred PCR-product, formamide, and internal size standard are retrieved from the denaturation chamber and capillary electrophoresis performed by the CE instrument to analyze the quality of the retrieved fragment products. FIG. 8(a) shows peaks from a mixture of on-cartridge PCR-product and on-cartridge transferred formamide and internal size standard. It clearly shows a peak of the PCR-generated fragment size of 332 bp for the genomic E. coli DNA. The peak is comparable from a peak obtained from tube PCR and manual mixing of formamide and internal size standard into a PCR-product from the tube PCR shown in FIG. 8(b). FIG. 8(c) shows capillary electrophoresis peak heights from four on-cartridge transferred mixtures compared to ones from tube controls (mean: 104%, standard deviation: 8%).

The new valve is designed and fabricated to meter a defined sample volume into a PCR chamber, to seal the PCR chamber during a PCR thermal cycle, and to transfer both a PCR-product from the PCR chamber and formamide from a formamide chamber to a denaturation chamber for integrated nucleic acid analysis by capillary electrophoresis. The new valve is required to perform the functions by the actuation of a peltier device installed in the instrument, which is used for a thermal activation, without any additional actuator such as commonly used air-pressure and without any need of precise alignment for the valve actuation. The new valve is also compatible with other microfluidic channels in the disposable plastic microfluidic cartridge and the existing operating system that has both a front peltier and a rear peltier for a faster thermal activation into the microfluidic cartridge.

To satisfy the functional and the operational requirements, the new valve has monolithic protrusions on an elastomeric membrane substrate. The protrusions are exposed above the PCR island on the microfluidic cartridge and are located in the valving region to be self-aligned while the intermediate adhesive provides both the fluidic interconnection channels and bonding to the plastic microfluidic cartridge. Thus, when the protrusions are squeezed by a peltier device that is brought to contact with the PCR island, they spontaneously close the fluidic interconnection channels for sealing during PCR. After PCR, when the peltier is physically separated from the PCR island, the protrusions relax back to the original shape that allows a transfer of PCR-product from the PCR chamber and the mixture of formamide and size standard from the formamide chamber into the denaturation chamber.

The new valve provided over 95% of metering performance in filling the fixed volume on the PCR chamber and preserved over 97% of the sample volume during PCR. The mixture of PCR-product, formamide, and size standard that are transferred by the valve show comparable capillary electrophoresis peak heights to the benchtop tube controls with consistent transfer volume. The design and the working principle of the new valve can be used when the similar requirements exist to perform integrated nucleic acid analysis by capillary electrophoresis.

REFERENCES

[1] Gi Won Shin, Yang Sook Cho, Hee Sung Hwang, Jin Hyun Park and Gyoo Yeol Jung, "A two-step quantitative pathogen detection system based on capillary electrophoresis," *Analytical Biochemistry*, vol. 383, pp. 31-37, 2008.

[2] A. Manz, N. Graber and H. M. Widmer, "Miniaturized total chemical analysis systems: A novel concept for chemical sensing," *Sensors and Actuators B: Chemical*, vol. 1, pp. 244-248, 1990.

[3] Kwang W Oh and Chong H Ahn, "A review of microvalves," *J. Micromech. Microeng.*, vol. 16, pp. R13-R39, 2006.

[4] Anthony K. Au, Hoyin Lai, Ben R. Utela and Albert Folch, "Microvalves and Micropumps for BioMEMS," *Micromachines*, vol. 2, pp. 179-220, 2011.

[5] Bozhi Yang and Qiao Lin, "A latchable microvalve using phase change of paraffin wax," *Sensors and Actuators A*, vol. 134, pp. 194-200, 2007.

[6] Chang-Yu Chen, Chang-Hung Chen, Ting-Yuan Tu, Cheng-Ming Lin and Andrew M. Wo, "Electrical isolation and characteristics of permanent magnet-actuated valves for PDMS microfluidics," *Lab Chip*, vol. 11, pp. 733-737, 2011.

[7] Karthik Pitchaimani, Brian C. Sapp, Adam Winter, Austin Gispanski, Toshikazu Nishida and Z. Hugh Fan, "Manufacturable plastic microfluidic valves using thermal actuation," *Lab Chip*, vol. 9, pp. 3082-3087, 2009.

[8] Kazuo Hosokawa and Ryutaro Maeda, "A pneumatically-actuated three-way microvalve fabricated with polydimethylsiloxane using the membrane transfer technique," *J. Micromech. Microeng., vol.* 10, pp. 415-420, 2000.

[9] Patrick M. Pilarski, Sophia Adamia and Christopher J. Backhouse, "An adaptable microvalving system for on-chip polymerase chain reactions," *Journal of Immunological Methods*, vol. 305, pp. 48-58, 2005.

[10] Govind V. Kaigala, Viet N. Hoang and Christopher J. Backhouse, "Electrically controlled microvalves to integrate microchip polymerase chain reaction and capillary electrophoresis," *Lab Chip*, vol. 8, pp. 1071-1078, 2008.

[11] Jenny A. Lounsbury, Anne Karlsson, Daniel C. Miranian, Stephen M. Cronk, Daniel A. Nelson, Jingyi Li, Doris M. Haverstick, Paul Kinnon, David J. Saul and James P. Landers, "From sample to PCR product in under 45 minutes: a polymeric integrated microdevice for clinical and forensic DNA analysis," *Lab Chip*, vol. 13, pp. 1384-1393, 2013.

[12] Emmanuel Roy, Gale Stewart, Maxence Mounier, Lidija Malic, Régis Peytavi, Liviu Clime, Marc Madou, Maurice Bossinot, Michel G. Bergeron and Teodor Veres, "From cellular lysis to microarray detection, an integrated thermoplastic elastomer (TPE) point of care Lab on a Disc," *Lab Chip*, vol. 15, pp. 406-416, 2015.

[13] William H Grover, Alison M Skelley, Chung N Liu, Eric T Lagally and Richard A Mathies, "Monolithic membrane valves and diaphragm pumps for practical large-scale integration into glass microfluidic devices," *Sensors and Actuators B: Chemical*, vol. 89, pp. 315-323, 2003.

[14] Marc A. Unger, Hou-Pu Chou, Todd Thorsen, Axel Scherer and Stephen R. Quake, "Monolithic Microfabricated Valves and Pumps by Multilayer Soft Lithography," *Science*, vol. 288, pp. 113-116, 2000.

[15] Ismail Emre Araci and Stephen R. Quake, "Microfluidic very large scale integration (mVLSI) with integrated micromechanical valves," *Lab Chip*, vol. 12, pp. 2803-2806, 2012.

[16] Young Shik Shin, Keunchang Cho, Sun Hee Lim, Seok Chung, Sung-Jin Park, Chanil Chung, Dong-Chul Han and Jun Keun Chang, "PDMS-based micro PCR chip with Parylene coating," *J. Micromech. Microeng*, vol. 13, pp. 768-774, 2003.

[17] S. Elizabeth Hulme, Sergey S. Shevkoplyas and George M. Whitesides, "Incorporation of prefabricated screw, pneumatic, and solenoid valves into microfluidic devices," *Lab Chip*, vol. 9, pp. 79-86, 2009.

[18] Cedric Hurth, Stanley D. Smith, Alan R. Nordquist, Ralf Lenigk, Brett Duane, David Nguyen, Amol Surve, Andrew J. Hopwood, Matthew D. Estes, Jianing Yang, Zhi Cai, Xiaojia Chen, John G. Lee-Edghill, Nina Moran, Keith Elliott, Gillian Tully and Frederic Zenhausern, "An automated instrument for human STR identification: Design, characterization, and experimental validation," *ELECTROPHORESIS*, vol. 31, pp. 3510-3517, 2010.

[19] I D Johnston, D K McCluskey, C K L Tan and M C Tracey, "Mechanical characterization of bulk Sylgard 184 for microfluidics and microengineering," *J. Micromech. Microeng*, vol. 24, pp. 035017, 2014.

[20] Jing Zhu, Chunmei Qiu, Mirko Palla, ThaiHuu Nguyen, James J. Russo, Jingyue Ju and Qiao Lin, "A microfluidic device for multiplex singlenucleotide polymorphism genotyping," *RSC Adv.*, vol. 4, pp. 4269-4277, 2014.

[21] Rachhpal S. Sahota and Morteza G. Khaledi, "Non-aqueous Capillary Electrophoresis," *Anal. Chem.*, vol. 66, pp. 1141-1146, 1994.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a size range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that materials, biological materials and methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An elastomeric valve assembly for controlled metering of a volume of fluid into a bioreactor chamber, the elastomeric valve assembly comprising:
   a thermally-activated actuator;
   a microfluidic cartridge having:
      a bioreactor chamber, the bioreactor chamber in thermal contact with the thermally-activated actuator;
      a fluidic conduit with an open channel portion, the fluidic conduit fluidically connected to the bioreactor chamber;
   an elastomeric membrane operably connected to the thermally-activated actuator, said elastomeric membrane having:
      a contact surface in fluidic contact with the open channel portion to form a constrained conduit; and
      a protrusion opposibly positioned to the contact surface;
   wherein upon thermal activation of the thermally-activated actuator the elastomeric membrane contact surface is forced into a lumen of the constrained conduit to fluidically seal the constrained conduit.

2. The elastomeric valve assembly of claim 1, wherein the elastomeric membrane has an average thickness that is greater than 200 µm and the protrusion has a height relative to an upper surface of the elastomeric membrane that is greater than or equal to 100 µm.

3. The elastomeric valve assembly of claim 2, having a protrusion height to elastomeric membrane thickness ratio that is greater than or equal to 0.3 and less than or equal to 1.

4. The elastomeric valve assembly of claim 1, having a protrusion height that is between 300 µm and 500 µm and an elastomeric membrane thickness that is between 500 µm and 700 µm.

5. The elastomeric valve assembly of claim 1, wherein the protrusion is configured to provide self-alignment with the constrained conduit and the protrusion has a protrusion height selected to correspond to a depth of the open channel portion to provide upon thermal activation of the actuator an at least 70% occupancy of an open channel volume by the elastomeric membrane, thereby fluidically sealing the fluidic conduit.

6. The elastomeric valve assembly of claim 1, wherein:
during rest the elastomeric membrane contact surface is substantially flat and the protrusion extends from an upper surface facing in a direction away from the contact surface; and
during thermal actuation of the actuator, a contact force exerted by the actuator on the protrusion forces a portion of the elastomeric membrane into a lumen of the constrained conduit, wherein: the elastomeric membrane portion has a volume that corresponds to at least 50% of a protrusion volume.

7. The elastomeric valve assembly of claim 1, wherein the fluidic conduit is formed in a rigid material.

8. The elastomeric valve assembly of claim 7, wherein the fluidic conduit further comprises a fluidic conduit divider to form an upstream passage and a downstream passage, wherein upon actuation of the thermally-activated actuator:
a first portion of the elastomeric membrane is forced into the upstream passage;
a second portion of the elastomeric membrane is forced into the downstream passage; and
a portion of the elastomeric membrane contact surface contacts a top surface of the fluidic conduit divider and a top surface of each of an upstream and downstream conduit portion.

9. The elastomeric valve assembly of claim 1, wherein the thermally-activated actuator is a peltier actuator integrated with a bioreactor for polymerase chain reaction (PCR), wherein the bioreactor chamber corresponds to a PCR chamber for nucleic acid amplification.

10. The elastomeric valve assembly of claim 9, wherein the elastomeric valve assembly spontaneously opens and closes with thermal cycling during PCR to provide biological fluid to the bioreactor and to fluidically seal the confined conduit for nucleic acid amplification in the bioreactor.

11. The elastomeric valve assembly of claim 1, having one or more of:
a constrained conduit cross-sectional area that is greater than or equal to 0.1 mm$^2$ and less than or equal to 10 mm$^2$;
a constrained conduit height in a fluidically open configuration that is greater than or equal to 100 μm and less than or equal to 1 mm;
a fluid flow rate through the constrained conduit during a fluidically open configuration that is greater than or equal to 1 μL/min and less than or equal to 100 μL/s;
a bioreactor chamber volume that is greater than or equal to 1 μL and less than or equal to 10 mL;
a volume of fluid introduced to the bioreactor chamber from the constrained conduit that is greater than or equal to 1 μL and less than or equal to 1 mL over a time course that corresponds to a decreased temperature;
a fluidically-open configuration for a temperature in the bioreactor chamber that is less than 50° C.;
a fluidically-sealed configuration for a temperature in the bioreactor chamber that is greater than 55° C.;
an elastomeric membrane Young's modulus that is less than 100 MPa;
a microfluidic cartridge Young's modulus that is greater than 10 GPa;
a contact force on the protrusion during thermal activation of the actuator that is between 5 N and 10 N and that forces a portion of the elastomeric membrane into the open channel volume to fluidically seal the constrained conduit; or
a pressure in the fluidic conduit under a fluidically-sealed configuration that is between 1 psi and 20 psi.

12. The elastomeric valve assembly of claim 1, further comprising a biochamber passage disposed through the elastomeric membrane configured to receive a PCR island in which PCR amplification occurs; a plurality of protrusions and a plurality of open channel volumes, each protrusion paired to a unique open channel volume.

13. The elastomeric valve assembly of claim 1, further comprising an adhesive layer positioned between a top surface of the microfluidic cartridge and a bottom surface of the elastomeric membrane.

14. The assembly of claim 1, wherein the protrusion has a volume, and a volume of the membrane that is forced into the constrained conduit lumen and downstream and upstream passage, corresponds to the protrusion volume for a portion of the membrane that does not correspond to the protrusion.

15. A system for polymerase chain reaction amplification of a polynucleotide, the system comprising:
a microfluidic cartridge having fluidic conduits for introducing and removing fluid to and from a PCR chamber, wherein at least one fluidic conduit has an open channel portion;
an elastomeric membrane operably connected to the microfluidic cartridge, the elastomeric membrane having:
a contact surface in fluidic contact with the open channel portion to form a constrained conduit;
a protrusion extending from a top surface and opposibly positioned to the contact surface;
a peltier operably connected to the protrusion and in thermal contact with the PCR chamber, wherein upon thermal activation during PCR thermal cycling the peltier forces a portion of the elastomeric membrane into a lumen of the constrained conduit to fluidically seal the constrained conduit.

16. The system of claim 15, wherein the protrusion has a volume, and the volume of the elastomeric membrane forced into the lumen of the constrained conduit substantially corresponds to the protrusion volume, the system further comprising:
a microfluidic pump for driving fluid flow in the fluidic conduits;
a biological sample chamber configured to receive polynucleotides from a sample and primers for amplification of a target sequence;
a fluid chamber configured to receive fluid for use with PCR amplification, wherein each of the fluid chamber and biological sample chamber are fluidically connected to the PCR chamber, and one or more open channel portions are positioned upstream of the PCR chamber to provide controlled fluid introduction to the PCR chamber from the biological sample chamber and the fluid chamber
a downstream fluid conduit positioned downstream of the PCR chamber, the downstream fluid conduit having a downstream constrained conduit; and
wherein the elastomeric membrane has a second protrusion positioned so that during PCR thermal cycling the peltier forces a portion of the elastomeric membrane into a lumen of the downstream constrained conduit to fluidically seal the downstream fluid conduit, thereby fluidically sealing the PCR chamber both downstream and upstream of the PCR chamber.

17. A method for controlled fluid metering to a bioreactor chamber, the method comprising the steps of:
  providing the assembly of claim 1;
  filling the constrained conduit and bioreactor chamber with a fluid;
  thermally contacting the bioreactor chamber with an actuator, wherein during the thermal contact the actuator forces a portion of the elastomeric membrane beneath the protrusion into the fluidic conduit to fluidically seal the constrained conduit;
  removing the thermal contact between the bioreactor chamber and the actuator, thereby relaxing the elastomeric membrane and removing the portion of the elastomeric membrane from the constrained conduit, thereby opening the constrained conduit so that fluid may flow into and/or out of the bioreactor chamber;
  wherein the fluidic opening occurs spontaneously for a temperature below a user-selected open temperature set-point and fluidic sealing occurs spontaneously for a temperature above a user-selected close temperature set-point.

18. The method of claim 17, wherein bioreactor chamber heating occurs from both a top side and a bottom side of the microfluidic cartridge.

19. The method of claim 17, wherein both the heating and actuation is from a peltier assembly.

* * * * *

SEQUENCE LISTING

<160> NUMBER OF SEQ ID NOS: 4

<210> SEQ ID NO 1
<211> LENGTH: 23
<212> TYPE: DNA
<213> ORGANISM: Artificial Sequence
<220> FEATURE:
<223> OTHER INFORMATION: synthetic construct

<400> SEQUENCE: 1
cgtatcachg tttgtgtgaa caa                                    23

```
<210> SEQ ID NO 2
<211> LENGTH: 22
<212> TYPE: DNA
<213> ORGANISM: Artificial Sequence
<220> FEATURE:
<223> OTHER INFORMATION: synthetic construct

<400> SEQUENCE: 2
ggattcacya cttgcaaagt cc                                              22

<210> SEQ ID NO 3
<211> LENGTH: 332
<212> TYPE: DNA
<213> ORGANISM: Artificial Sequence
<220> FEATURE:
<223> OTHER INFORMATION: synthetic construct

<400> SEQUENCE: 3
cgtatcaccg tttgtgtgaa caacgaactg aactggcaga ctatcccgcc gggaatggtg      60
attaccgacg aaaacggcaa gaaaaagcag tcttacttcc atgatttctt taactatgcc     120
gggatccatc gcagcgtaat gctctacacc acgccgaaca cctgggtgga cgatatcacc     180
gtggtgacgc atgtcgcgca agactgtaac cacgcgtctg ttgactggca ggtggtggcc     240
aatggtgatg tcagcgttga actgcgtgat gcggatcaac aggtggttgc aactggacaa     300
ggcactagcg ggactttgca agtggtgaat cc                                   332

<210> SEQ ID NO 4
<211> LENGTH: 332
<212> TYPE: DNA
<213> ORGANISM: Artificial Sequence
<220> FEATURE:
<223> OTHER INFORMATION: synthetic construct

<400> SEQUENCE: 4
ggattcacca cttgcaaagt cccgctagtg ccttgtccag ttgcaaccac ctgttgatcc      60
gcatcacgca gttcaacgct gacatcacca ttggccacca cctgccagtc aacagacgcg     120
tggttacagt cttgcgcgac atgcgtcacc acggtgatat cgtccaccca ggtgttcggc     180
gtggtgtaga gcattacgct gcgatggatc ccggcatagt taaagaaatc atggaagtaa     240
gactgctttt tcttgccgtt ttcgtcggta atcaccattc ccggcgggat agtctgccag     300
ttcagttcgt tgttcacaca aacggtgata cg                                   332
```